(12) United States Patent
Van Der Auwera et al.

(10) Patent No.: US 10,652,553 B2
(45) Date of Patent: May 12, 2020

(54) SYSTEMS AND METHODS OF SIGNALING OF REGIONS OF INTEREST

(71) Applicant: QUALCOMM Incorporated, San Diego, CA (US)

(72) Inventors: Geert Van Der Auwera, Del Mar, CA (US); Yekui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/828,281

(22) Filed: Nov. 30, 2017

(65) Prior Publication Data

US 2018/0160123 A1 Jun. 7, 2018

Related U.S. Application Data

(60) Provisional application No. 62/431,375, filed on Dec. 7, 2016.

(51) Int. Cl.
*H04N 19/167* (2014.01)
*H04N 19/513* (2014.01)
(Continued)

(52) U.S. Cl.
CPC .......... *H04N 19/167* (2014.11); *G06T 15/00* (2013.01); *G06T 17/00* (2013.01); *H04N 19/17* (2014.11);
(Continued)

(58) Field of Classification Search
CPC ...... H04N 19/167; H04N 19/17; H04N 19/46; H04N 19/513; G06T 15/00; G06T 17/00
(Continued)

(56) References Cited

U.S. PATENT DOCUMENTS

2017/0345205 A1* 11/2017 Lai ................. H04N 13/232
2017/0347026 A1* 11/2017 Hannuksela ......... H04N 19/00
(Continued)

OTHER PUBLICATIONS

International Search Report and Written Opinion—PCT/US2017/064349—ISA/EPO—Feb. 12, 2018.
(Continued)

*Primary Examiner* — Zaihan Jiang
(74) *Attorney, Agent, or Firm* — Kilpatrick Townsend & Stockton, LLP

(57) ABSTRACT

Techniques and systems are provided for processing video data. In one example, a media file associated with 360-degree video data can be obtained. The 360-degree video data may include a spherical representation of a scene. The media file may include first signaling information and second signaling information of a viewport region corresponding to a region of interest (ROI) in the spherical representation. The first signaling information may include a center position and a dimension of the viewport region measured in a spherical space associated with the spherical representation. The second signaling information may indicate a region of a picture comprising the viewport region, the picture being formed by projecting the spherical representation including the ROI onto a plane. Pixels corresponding to the viewport region from the data of the picture can be extracted based on the first signaling information and second signaling information, and can be provided for rendering.

42 Claims, 19 Drawing Sheets

(51) Int. Cl.
*H04N 19/17* (2014.01)
*G06T 17/00* (2006.01)
*G06T 15/00* (2011.01)
*H04N 19/46* (2014.01)
*H04N 19/597* (2014.01)

(52) U.S. Cl.
CPC .......... *H04N 19/46* (2014.11); *H04N 19/513* (2014.11); *H04N 19/597* (2014.11)

(58) Field of Classification Search
USPC .................................................. 375/240.01
See application file for complete search history.

(56) References Cited

U.S. PATENT DOCUMENTS

2018/0374192 A1* 12/2018 Kunkel ................. G06T 15/205
2019/0238612 A1* 8/2019 Xie ........................ H04N 13/00

OTHER PUBLICATIONS

Thomas E., et al., "Projection-independent ROI Signalling for Spherical Content [OMAF]", 116. MPEG Meeting; Oct. 17, 2016-Oct. 21, 2016; Chengdu; (Motion Picture Expert Group or ISO/IEC JTC1/SC29/WG11), No. m39424, Oct. 12, 2016 (Oct. 12, 2016), XP030067770, 4 pages.

Wang X., et al., "Carriage of CICP Information for Multiple Media Sources in ISOBMFF", 116. MPEG Meeting; Oct. 17, 2016-Oct. 21, 2016; Chengdu; (Motion Picture Expert Group or ISO/IEC JTC1/SC29/WG11), No. m39321, Oct. 17, 2016 (Oct. 17, 2016), XP030067667, 9 pages.

Wang Y-K., et al., "OMAF ROI Signalling in ISOBMFF", 117. MPEG Meeting; Jan. 16, 2017-Jan. 20, 2017; Geneva; (Motion Picture Expert Group or ISO/IEC JTC1/SC29/WG11), No. m39978, Jan. 11, 2017 (Jan. 11, 2017), XP030068323, 4 pages.

Wang Y-K., et al., "Viewport Dependent Processing in VR: Partial Video Decoding", 115. MPEG Meeting; May 30, 2016-Mar. 6, 2016; Geneva; (Motion Picture Expert Group or ISO/IEC JTC1/SC29/WG11), No. m38559, May 25, 2016 (May 25, 2016), XP030066915, 7 pages.

"Descriptions of Verification Experiments for Omnidirectional Media Application Format", 116. MPEG Meeting; Oct. 17, 2016-Oct. 21, 2016; Chengdu; (Motion Picture Expert Group or ISO/IEC JTC1/SC29/WG11), No. N16440, Nov. 2, 2016 (Nov. 2, 2016), XP030023112, 25 pages.

* cited by examiner

```
Obtain a media file associated with 360-degree video
data, the 360-degree video data including a spherical
representation of a scene, the media file including first
signaling information and second signaling information
of a viewport region corresponding to a region of
interest (ROI) in the spherical representation, the first
signaling information including a center position and a
dimension of the viewport region measured in a
spherical space associated with the spherical
representation, and the second signaling information
indicating a region of a picture comprising the viewport
region, the picture being formed by projecting the
spherical representation including the ROI onto a plane
1302
```

```
Extract pixels corresponding to the viewport region from
the data of the picture based on the first signaling
information and second signaling information
1304
```

```
Provide the pixels to render the viewport region in a
display
1306
```

FIG. 13

SYSTEMS AND METHODS OF SIGNALING OF REGIONS OF INTEREST

CROSS-REFERENCE TO RELATED APPLICATIONS

This application claims the benefit of U.S. Provisional Application No. 62/431,375, filed Dec. 7, 2016, which is hereby incorporated by reference, in its entirety and for all purposes.

FIELD

This application is related to video coding and compression. More specifically, this application relates to systems and methods of generating and processing files for signaling regions of interest.

BACKGROUND

Many devices and systems allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include high-efficiency video coding (HEVC), advanced video coding (AVC), moving picture experts group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that facilitates both the transmission of video data as well as the rendering of the video data.

BRIEF SUMMARY

In some examples, techniques and systems are described herein for generating media files for 360-degree video content to include signaling information of one or more regions of interest (ROIs) in the 360-degree video content. Techniques and systems are also described herein for processing the signaling information included in the media files to extract the one or more ROIs from the video content for rendering. The 360-degree video content may be a spherical video formed by stitching a set of images capturing a scene at a certain point in time. A ROI of a 360-degree video picture can be a pre-determined region of the picture capturing a certain portion of the scene (e.g., a region based on a director's cut to direct the audience's view, a region that is statistically most likely to be rendered to a user at the presentation time of the picture, or other pre-determined region of interest). The ROI can also be dynamically determined based on, for example, the viewer's orientation. The signaling information can be used for various purposes, such as for data pre-fetching in 360-degree video adaptive streaming, for transcoding optimization when a 360-degree video is transcoded, for cache management, for facilitating rendering of the 360-degree video, among others.

The media files can include any suitable streaming media file, such as a media presentation description (MPD) used for adaptive bitrate streaming media according to the Dynamic Adaptive Streaming over HyperText Transfer Protocol (HTTP) (known as DASH), or other suitable file according to any other suitable adaptive streaming protocol.

In some examples, a method of processing video data is provided. The method may comprise obtaining a media file associated with 360-degree video data, the 360-degree video data including a spherical representation of a scene, the media file including first signaling information and second signaling information of a viewport region corresponding to a region of interest (ROI) in the spherical representation, the first signaling information including a center position and a dimension of the viewport region measured in a spherical space associated with the spherical representation, and the second signaling information indicating a region of a picture comprising the viewport region, the picture being formed by projecting the spherical representation including the ROI onto a plane. The method may further comprise extracting pixels corresponding to the viewport region from the data of the picture based on the first signaling information and second signaling information, and providing the pixels to render the viewport region for display.

In some aspects, the first signaling information may include a first angle and a second angle of a center of the viewport region with respect to a spherical center of the spherical representation of the scene, the first angle being formed on a first plane and the second angle being formed on a second plane, the first plane being perpendicular to the second plane.

In some aspects, the first signaling information may further include a third angle associated with a width of the viewport region and a fourth angle associated with a height of the viewport region.

In some aspects, the third angle may be formed between a first edge and a second edge of the viewport region; and wherein the fourth angle is formed between a third edge and a fourth edge of the viewport region.

In some aspects, the ROI may be defined by at least four planes that intersect with the spherical representation; and wherein each of the four planes also intersects with the spherical center. In some aspects, the shape of the viewport region may be determined based on the intersections of the at least four planes with the spherical representation. In some aspects, the pixels corresponding to the viewport region are extracted based on the shape.

In some aspects, the picture may include a plurality of tiles. The second signaling information may define one or more tiles of the picture including the viewport region. In some aspects, the method may further comprise obtaining the one or more tiles from the plurality of tiles based on the second signaling information, and extracting the pixels from the one or more tiles.

In some aspects, the second signaling information may include one or more coordinates associated with the one or more tiles in the picture. The one or more tiles may form a tile group, and the second signaling information may include a group identifier associated with the tile group. In some aspects, the plurality of tiles are motion-constrained tiles.

In some aspects, the second signaling information may include pixel coordinates associated with a pre-determined location within a viewport region formed by projecting the ROI on a plane, a width of the viewport region, and a height of the viewport region. The media file may be based on an International Standards Organization (ISO) base media file format (ISOBMFF). The media file may identify a sample group including a video sample corresponding to the spherical video scene; and wherein the first signaling information and the second signaling information are included in one or more syntax elements of the sample group.

In some aspects, the media file may be based on a media presentation description (MPD) format and includes one or more adaptation sets. Each of the one or more adaptation sets may include one or more representations. The first signaling information, the second signaling information, and a link to the picture may be included in one or more elements associated with the ROI included in the one or more representations. In some aspects, the method may further comprise obtaining the picture based on the link included in the media file.

In some aspects, the one or more representations may be tile-based representations, and the second signaling information may include identifiers associated with tiles including the ROI included in the one or more tile-based representations.

In some aspects, the spherical representation of the scene may be projected onto the plane using a rectilinear projection.

In some aspects, the method may further comprise extracting pixels of multiple ROIs from the picture based on the first signaling information and the second signaling information.

In some examples, an apparatus for processing video data is provided. The apparatus may comprise a memory configured to store 360-degree video data, and a processor configured to: obtain a media file associated with the 360-degree video data, the 360-degree video data including a spherical representation of a scene, the media file including first signaling information and second signaling information of a viewport region corresponding to a region of interest (ROI) in the spherical representation, the first signaling information including a center position and a dimension of the viewport region measured in a spherical space associated with the spherical representation, and the second signaling information indicating a region of a picture comprising the viewport region, the picture being formed by projecting the spherical representation including the ROI onto a plane. The processor may be further configured to extract pixels corresponding to the viewport region from the data of the picture based on the first signaling information and second signaling information, and provide the pixels to render the viewport region for display.

In some aspects, the processor is further configured to determine, from the first signaling information, a first angle and a second angle of a center of the viewport region with respect to a spherical center of the spherical representation of the scene, the first angle being formed on a first plane and the second angle being formed on a second plane, the first plane being perpendicular to the second plane.

In some aspects, the processor is further configured to determine, from the first signaling information, a third angle associated with a width of the viewport region and a fourth angle associated with a height of the viewport region.

In some aspects, the third angle is formed between a first edge and a second edge of the viewport region; and wherein the fourth angle is formed between a third edge and a fourth edge of the viewport region. In some aspects, the ROI is defined by at least four planes that intersect with the spherical representation; and wherein each of the four planes also intersects with the spherical center.

In some aspects, the processor is further configured to determine a shape of the viewport region based on the intersections of the at least four planes with the spherical representation.

In some aspects, the processor is configured to extract the pixels corresponding to the viewport region based on the shape.

In some aspects, the picture may include a plurality of tiles, and the second signaling information may define one or more tiles of the picture including the viewport region. The processor is further configured to obtain the one or more tiles from the plurality of tiles based on the second signaling information, and extract the pixels from the one or more tiles.

In some aspects, the processor is further configured to determine, from the second signaling information, one or more coordinates associated with the one or more tiles in the picture.

In some aspects, the one or more tiles form a tile group. The processor is further configured to determine, from the second signaling information, a group identifier associated with the tile group. In some aspects, the plurality of tiles are motion-constrained tiles.

In some aspects, the processor is further configured to determine, from the second signaling information, pixel coordinates associated with a pre-determined location within a viewport region formed by projecting the ROI on a plane, a width of the viewport region, and a height of the viewport region.

In some aspects, the media file is based on an International Standards Organization (ISO) base media file format (ISOBMFF). The media file may identify a sample group including a video sample corresponding to the spherical video scene; and wherein the processor is further configured to extract the first signaling information and the second signaling information from one or more syntax elements of the sample group.

In some aspects, the media file is based on a media presentation description (MPD) format and includes one or more adaptation sets. Each of the one or more adaptation sets may include one or more representations. The processor is further configured to determine, based on one or more elements associated with the ROI included in the one or more representations, the first signaling information, the second signaling information and a link to the picture; and obtain the picture based on the link included in the media file.

In some aspects, the one or more representations are tile-based representations. The processor is further configured to determine, based on the second signaling information, identifiers associated with tiles including the ROI included in the one or more tile-based representations.

In some aspects, the spherical representation of the scene is projected onto the plane using a rectilinear projection.

In some aspects, the processor is further configured to extract pixels of multiple ROIs from the picture based on the first signaling information and the second signaling information.

In some aspects, the apparatus may comprise a mobile device with one or more cameras to capture the 360-degree video data. In some aspects, the apparatus may comprise a display to render the viewport region.

In some examples, a non-transitory computer-readable medium is provided. The non-transitory computer-readable medium may have stored thereon instructions that, when executed by one or more processors, cause the one or more processor to: obtain a media file associated with 360-degree video data, the 360-degree video data including a spherical representation of a scene, the media file including first signaling information and second signaling information of a viewport region corresponding to a region of interest (ROI) in the spherical representation, the first signaling information including a center position and a dimension of the viewport region measured in a spherical space associated with the spherical representation, and the second signaling information indicating a region of a picture comprising the viewport region, the picture being formed by projecting the spherical representation including the ROI onto a plane; extract pixels corresponding to the viewport region from the data of the picture based on the first signaling information and second signaling information; and provide the pixels to render the viewport region for display.

In some examples, a method of processing video data is provided. The method may comprise: obtaining 360-degree video data, the 360-degree video data including a spherical representation of a scene; determining a region of interest (ROI) in the spherical representation of the scene; generating a media file including first signaling information and second signaling information of a viewport region corresponding to the ROI, the first signaling information including a center position and a dimension of the viewport region measured in a spherical space associated with the spherical representation, and the second signaling information indicating a region of a picture comprising the viewport region, wherein the picture is formed by projecting the spherical representation including the ROI onto a plane; and providing the media file for rendering the 360-degree video data or for transmission of a portion of the 360-degree video data including at least the ROI.

In some examples, an apparatus for processing video data is provided. The apparatus may comprise a memory configured to store 360-degree video data, and a processor configured to: obtain 360-degree video data, the 360-degree video data including a spherical representation of a scene; determine a region of interest (ROI) in the spherical representation of the scene; generate a media file including first signaling information and second signaling information of a viewport region corresponding to the ROI, the first signaling information including a center position and a dimension of the viewport region measured in a spherical space associated with the spherical representation, and the second signaling information indicating a region of a picture comprising the viewport region, wherein the picture is formed by projecting the spherical representation including the ROI onto a plane; and provide the media file for rendering the 360-degree video data or for transmission of a portion of the 360-degree video data including at least the ROI.

In some examples, a non-transitory computer-readable medium is provided. The non-transitory computer-readable medium may have stored thereon instructions that, when executed by one or more processors, cause the one or more processor to: obtain 360-degree video data, the 360-degree video data including a spherical representation of a scene; determine a region of interest (ROI) in the spherical representation of the scene; generate a media file including first signaling information and second signaling information of a viewport region corresponding to the ROI, the first signaling information including a center position and a dimension of the viewport region measured in a spherical space associated with the spherical representation, and the second signaling information indicating a region of a picture comprising the viewport region, wherein the picture is formed by projecting the spherical representation including the ROI onto a plane; and provide the media file for rendering the 360-degree video data or for transmission of a portion of the 360-degree video data including at least the ROI.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 11 is an XML code representation illustrating an example of signaling of a viewport corresponding to an ROI in an MPD file, in accordance with some examples;

FIG. 12 and FIG. 13 are flowcharts illustrating example processes for processing video data, in accordance with some examples;

DETAILED DESCRIPTION

Figure 1:
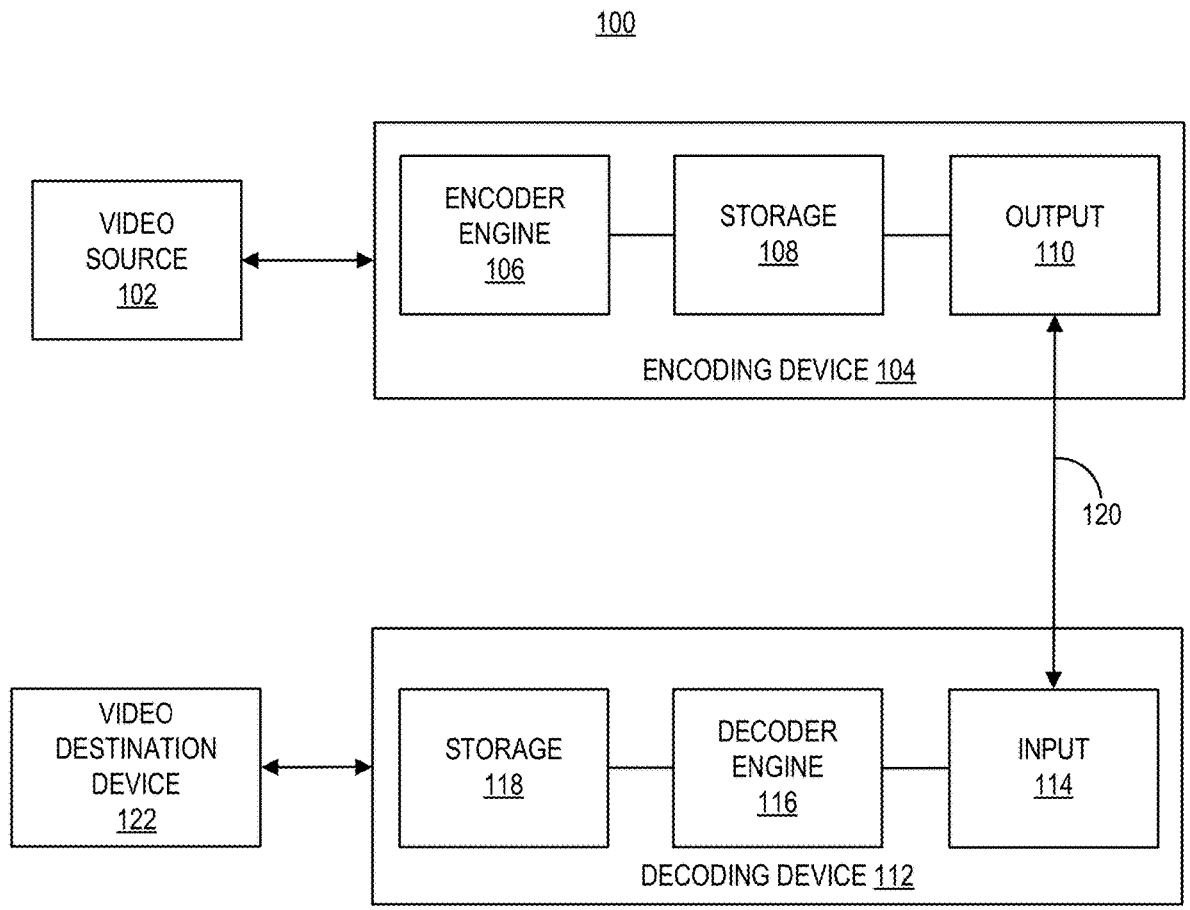
FIG. 1 is a block diagram illustrating an example of an encoding device and a decoding device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Video content can be captured and coded as 360-degree video content (also referred to as virtual reality (VR) content). As described in more detail below, one or more systems and methods described herein are directed to generating media files for 360-degree video content to include signaling information of one or more regions of interest (ROIs) in the video content. One or more systems and methods described herein are also directed to processing the signaling information included in the media files to extract the ROI from the video content for rendering. The video content may be a spherical video formed by stitching a set of images capturing a scene at certain points in time. A ROI of a 360-degree video picture can be a pre-determined region of the picture capturing a certain portion of the scene. In some cases, an ROI can correspond to a dynamically-determined portion of the scene (e.g., a portion of the scene currently viewed by the user). A media file may include first signaling information and second signaling information of the ROI. The first signaling information may include a first location of the ROI and dimension information of the ROI in a three-dimensional spherical space corresponding to the spherical video. The second signaling information may include a second location of the ROI in a two-dimensional space formed by projecting the spherical space onto a plane. In some examples, the dual signaling can provide a mapping between the first location and the second location of the ROI. The mapping can facilitate both transmission and rendering of the spherical video data.

360-degree video can include virtual reality video, augmented reality data, or any other type of 360-degree type video content, whether captured, computer-generated, or the like. For example, 360-degree video can provide the ability to be virtually present in a non-physical world created by the rendering of natural and/or synthetic images (and in some cases sound) correlated by the movements of the immersed user, allowing the user to interact with that world. 360-degree video can represent a three-dimensional environment that can be interacted with in a seemingly real or physical way. In some cases, a user experiencing a 360-degree video environment uses electronic equipment, such as a head-mounted display (HMD), and optionally certain tools or clothing (e.g., gloves fitted with sensors), to interact with the virtual environment. As the user moves in the real world, images rendered in the virtual environment also change, giving the user the perception that the user is moving within the virtual environment. In some cases, the virtual environment includes sound that correlates with the movements of the user, giving the user the impression that the sounds originate from a particular direction or source. 360-degree video can be captured and rendered at very high quality, potentially providing a truly immersive 360-degree video or virtual reality experience. 360-degree video applications include gaming, training, education, sports video, online shopping, among others.

360-degree video is video captured for display in a 360-degree environment. In some applications, video from the real world can be used in the presentation of a virtual reality environment, as opposed to computer-generated graphics, such as may be found in gaming and virtual worlds. In these applications, a user can experience another location in the same way that the user can experience the user's present location. For example, a user can experience a walking tour of Berlin while using a 360-degree video system that is situated in San Francisco.

A 360-degree video system can include a video capture device and a video display device, and possibly also other intermediate devices such as servers, data storage, and data transmission equipment. A video capture device may include a camera set, which can include a set of multiple cameras, each oriented in a different direction and capturing a different view. In one illustrative example, six cameras can be used to capture a full 360-degree view centered on the camera set's location. Some video capture devices may use fewer cameras. For example, some video capture devices capture primarily side-to-side views or use lenses with a wide field of view. In one illustrative example, one or more cameras equipped with two fisheye lenses, positioned back-to-back, can be used to capture two images that together provide a 360-degree field of view. A video generally includes frames or pictures, where a frame or picture is an electronically coded still image of a scene. Cameras capture a certain number of frames per second, which is usually referred to as the camera's frame rate.

In some cases, to provide a seamless 360-degree view, image stitching can be performed on the video frames (or images) captured by each of the cameras in the camera set. Image stitching in the case of 360-degree video generation involves combining or merging video frames from adjacent cameras (or lenses) in the area where the video frames overlap or would otherwise connect. The result would be an approximately spherical frame, and similar to a Mercator projection, the merged data can be represented in a planar fashion. For example, the pixels in a merged video frame may be mapped onto the planes of a cube shape, or some other three-dimensional, planar shape (e.g., a pyramid, an octahedron, a decahedron, etc.). Video capture and video display devices can operate on a raster principle—meaning that a video frame is treated as a grid of pixels—in which case square planes, rectangular planes, or other suitably-shaped planes can be used to represent a spherical environment.

360-degree video frames, mapped to a planar representation, can be encoded and/or compressed for storage and/or transmission. Encoding and/or compression can be accomplished using a video codec (e.g., code that is compliant with the High-Efficiency Video Coding (HEVC) standard, which is also known as H.265, the Advanced Video Coding standard, which is known as H.264, or other suitable codec) and results in a compressed video bitstream (or encoded video bitstream) or group of bitstreams. Encoding of video data using a video codec is described in further detail below.

In some implementations, the encoded video bitstream(s) can be stored and/or encapsulated in a media format or file format. The stored bitstream(s) can be transmitted, for example, over a network, to a receiver device that can decode and render the video for display. Such a receiver device may be referred to herein as a video display device. For example, a 360-degree video system can generate encapsulated files from the encoded video data (e.g., using an International Standards Organization (ISO) base media file format and/or derived file formats). For instance, the video codec can encode the video data and an encapsulation engine can generate the media files by encapsulating the video data in one or more ISO format media files. Alternatively or additionally, the stored bitstream(s) can be provided directly from a storage medium to a receiver device.

A receiver device can also implement a codec to decode and/or decompress an encoded video bitstream. In cases in which the encoded video bitstream(s) are stored and/or encapsulated in a media format or file format, the receiver device can support the media or file format that was used to pack the video bitstream into a file (or files), and can extract the video (and possibly also audio) data to generate the encoded video data. For example, the receiver device can parse the media files with the encapsulated video data to generate the encoded video data, and the codec in the receiver device can decode the encoded video data.

The receiver device can then send the decoded video signal to a rendering device (e.g., a video display device, player device, or other suitable rendering device). Rendering devices include, for example, head-mounted displays, virtual reality televisions, and other 180 or 360-degree display devices. Generally, a head-mounted display is able to track the movement of a wearer's head and/or the movement of a wearer's eyes. The head-mounted display can use the tracking information to render the part of a 360-degree video that corresponds to the direction in which the wearer is looking, so that the wearer experiences the virtual environment in the same way that she would experience the real world. A rendering device may render a video at the same frame rate at which the video was captured, or at a different frame rate.

The video pictures of 360-degree video content can be encoded as a single-layer bitstream using temporal inter prediction (TIP), and the entire coded bitstream can be stored at a server. In some cases, the pictures of 360-degree video content can be encoded as a multi-layer bitstream using TIP and inter-layer prediction (ILP). If needed, the bitstream can be transmitted to the receiver side, fully decoded by the decoder, and the region of the decoded picture corresponding to a portion of a scene being viewed by the wearer (e.g., determined based on the movement of the wearer's head and/or eyes) can be rendered to the wearer.

FIG. 1 is a block diagram illustrating an example of a video coding system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, and High Efficiency Video Coding (HEVC) or ITU-T H.265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions has been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). MPEG and ITU-T VCEG have also formed a joint exploration video team (WET) to explore new coding tools for the next generation of video coding standard. The reference software is called JEM (joint exploration model).

Many embodiments described herein provide examples using the JEM model, the HEVC standard, and/or extensions thereof. However, the techniques and systems described herein may also be applicable to other coding standards, such as AVC, MPEG, extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame of a video is a still image of a scene. The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. The slices are then partitioned into coding tree blocks (CTBs) of luma samples and chroma samples. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quad tree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with Intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

The encoding device 104 may then perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bitrate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can be use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data.

The input 114 of the decoding device 112 receives the encoded video bitstream data and may provide the video bitstream data to the decoder engine 116, or to storage 118 for later use by the decoder engine 116. The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 14. An example of specific details of the decoding device 112 is described below with reference to FIG. 15.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

In some implementations, camera sets for capturing 360-degree video can include omnidirectional cameras, catadioptric cameras (a camera that uses lenses and curved mirrors), cameras equipped with fisheye lenses, and/or other suitable cameras. One example of an omnidirectional camera is the Ricoh Theta-S, which uses two fisheye lenses that focus in opposite directions.

Figure 2B:
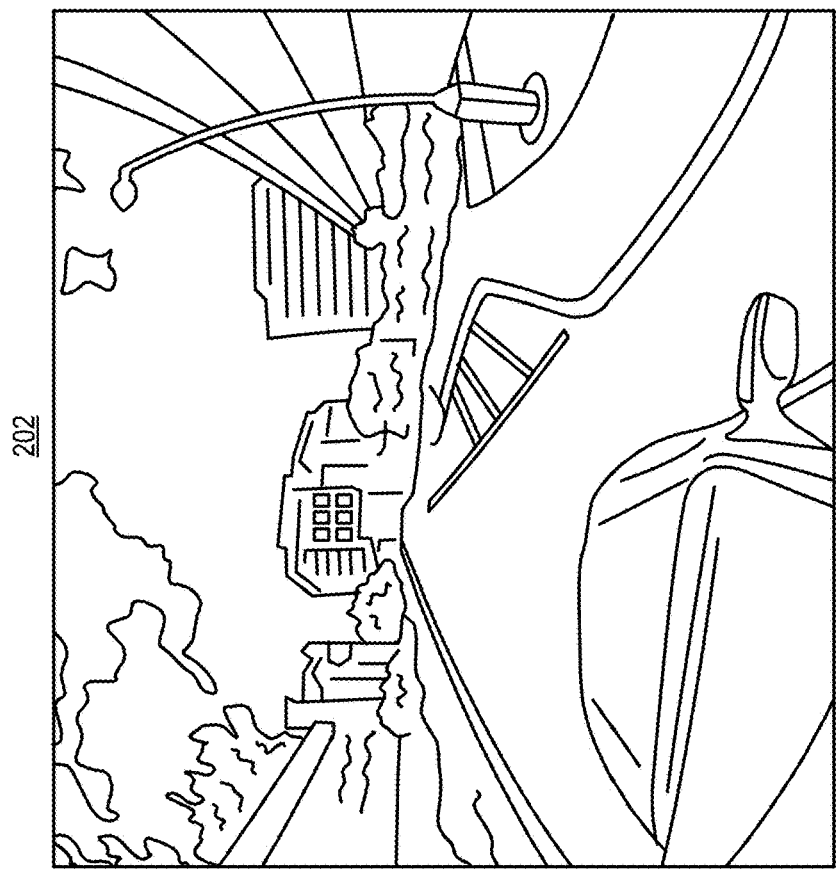
FIG. 2A and FIG. 2B are diagrams illustrating examples of video frames captured by omnidirectional cameras that use fisheye lenses to capture a wide field of view, in accordance with some examples.
Figure 2A:
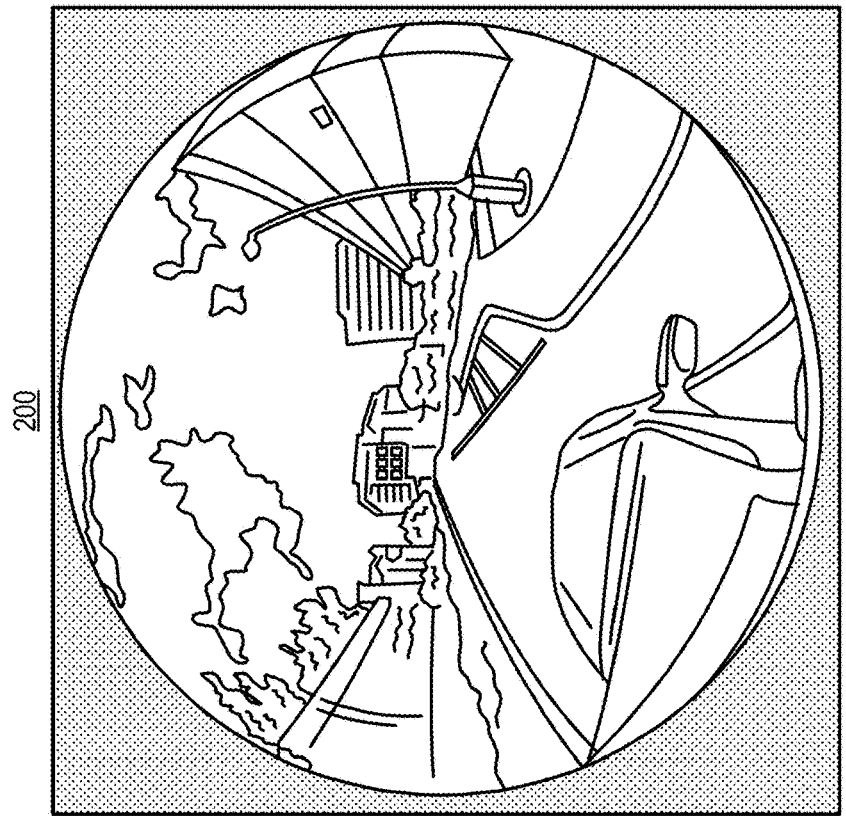

Omnidirectional cameras, such as catadioptric cameras and cameras with fisheye lenses, typically capture images with a significant amount of distortion. FIG. 2A and FIG. 2B illustrate examples of video frames captured by omnidirectional cameras that use fisheye lenses to capture a wide field of view. In the example of FIG. 2A, the video frame 200 includes a circular fisheye image. Fisheye lenses are capable of capturing very wide angles, such as 280 degrees or greater. Hence, a camera equipped with two fisheye lenses, positioned back-to-back, can capture two images that together provide 360 degrees of view (or more). Non-wide-angle fisheye lenses capture a field of view of on the order of about 45 to about 90 degrees. A field of view can alternatively or additionally be expressed in radians.

In order to capture a wide angle, fisheye lenses distort the image of a scene. As illustrated in FIG. 2A, the scene captured in the video frame 200 is circular in shape, and is warped from the center to the outside edges of this circular region. Because camera sensors are rectangular, the video frame 200 is rectangular and the image includes areas, here illustrated using stippling, that are not part of the scene. The pixels in these regions are considered not usable, since these pixels are not part of the scene.

The example of FIG. 2B includes a video frame 202 that includes a full-frame fisheye image. In this type of video frame 202, a wide-angle field of view has also been captured in a circular region, with the scene being warped into the circular region. In this example, the image has been scaled (e.g., made larger) so the scene fills the edges of the rectangular frame. This example video frame 202 does not include the unusable areas, and some parts of the scene that can be captured by the lens have been cropped out or not captured.

As described above, other types of cameras can also be used to capture 360-degree video. For example, a camera set can include a set of multiple cameras (e.g., 5, 6, 7, or other number of cameras needed to capture a sufficient number of views of a scene). Each camera can be oriented in a different direction and capturing a different view of a scene. Image stitching can then be performed on the video frames (or images) captured by each of the cameras in the camera set to provide a seamless 360-degree view.

Figure 3:
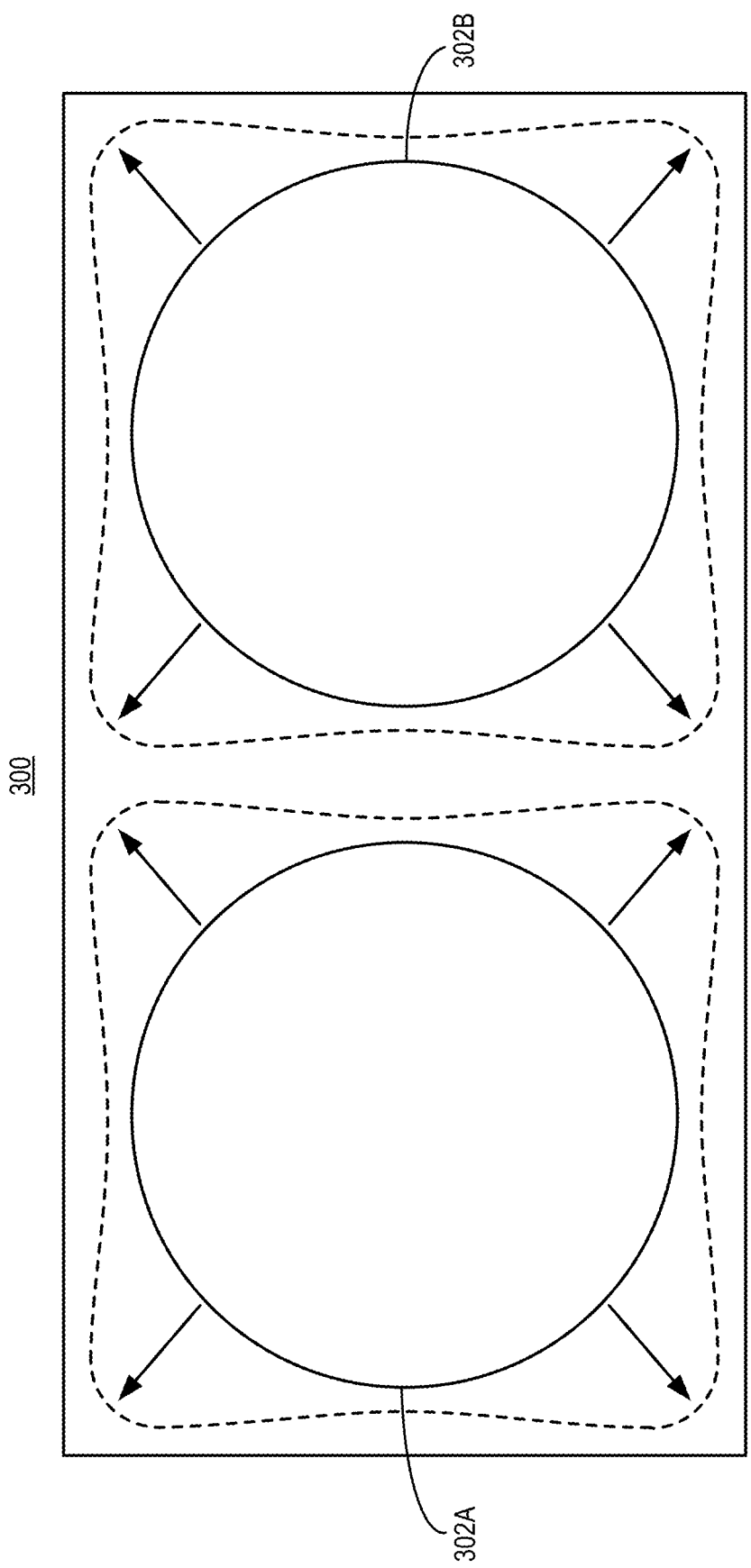
FIG. 3 is a diagram illustrating an example of an equirectangular video frame, in accordance with some examples.

360-degree video can be remapped to other formats. These other formats can be used to store, transmit, and/or view the 360-degree video. One example format is an equirectangular format. FIG. 3 illustrates an example of an equirectangular video frame 300 based on two fisheye images 302A, 302B. In this example equirectangular video frame 300, the usable pixels from the two fisheye images 302A, 302B (e.g., pixels in the circular regions) have been mapped into an equirectangular format. In this example, each fisheye image 302A, 302B includes a 180-degree or greater field of view, so that, together, the two fisheye images 302A, 302B encompass a 360-degree field of view (possibly with some overlap).

Mapping pixels from the fisheye images 302A, 302B has the effect of unwarping the scene captured in the fisheye images 302A, 302B, and stretching the pixels towards the edges of the video frame 300. The resulting equirectangular image may appear stretched at the top and bottom of the video frame 300. A well-known equirectangular projection is a Mercator projection, in which the geography of the Earth is presented with orthogonal latitude and longitude lines.

In various implementations, the fisheye images 302A, 302B can be mapped to other formats, such as onto the faces formed by a cube, a cylinder, a pyramid, a truncated pyramid, or some other geometric shape. In each of these cases, distortion present in the fisheye images 302A, 302B can be corrected and unusable pixels can be eliminated. The planar data can also be packaged for storage and/or transmission, and can be used for displaying the 360-degree video.

In some cases, an intermediate format can be useful, for example, for storing and/or transmitting 360-degree video data, or for converting the video data to another format. For example, an equirectangular representation can be mapped to a spherical format (e.g., a spherical geometry) to display the video data, as illustrated in FIGS. 4A and 4B.

Figure 4A:
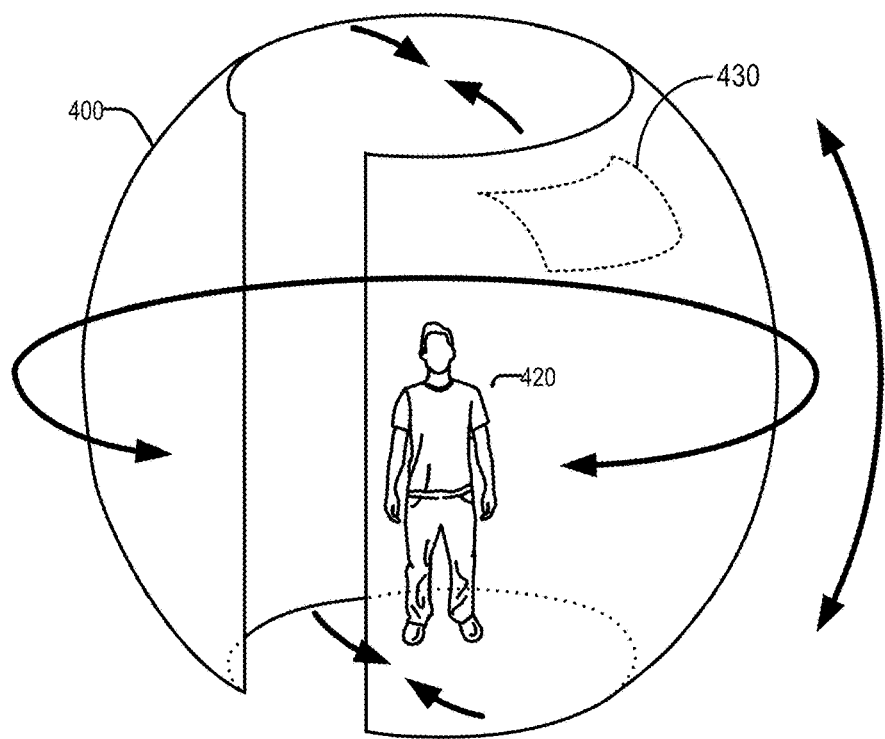
FIG. 4A, FIG. 4B, FIG. 4C, FIG. 4D, and FIG. 4E are diagrams illustrating examples of an equirectangular video frame and signaling of a viewport corresponding to a region of interest (ROI) in the video frame, in accordance with some examples.
Figure 4B:
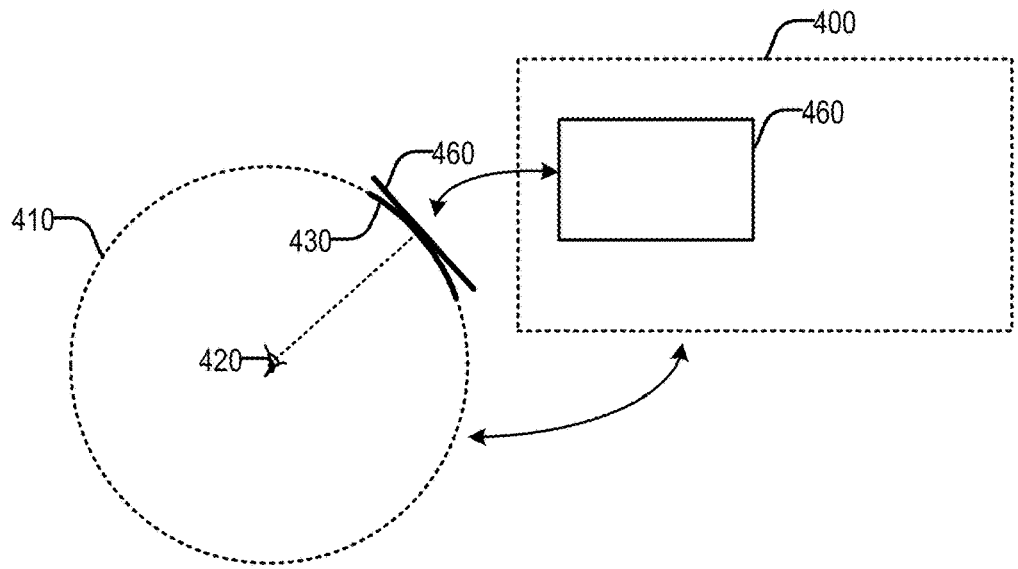

FIGS. 4A and 4B illustrates an example of an equirectangular video frame 400 being used in a 360-degree video presentation. The equirectangular video frame 400 can be mapped onto a spherical space to form a spherical representation 410, and a resulting spherical representation can be displayed to a viewer 420 using a head-mounted display or some other 360-degree video display device. In other examples, the equirectangular video frame 400 can be mapped to a cubical, cylindrical, pyramidal, or some other geometric shape, where the geometric shape can be used by the 360-degree video display device to display the video.

As noted above, an equirectangular video frame 400 can capture a full 360-degree field of view, with the pixels in the upper and lower regions appearing stretched and/or compressed. To use the equirectangular video frame 400 in a 360-degree video presentation, the pixels in the equirectangular video frame 400 can be mapped to spherical representation 410. This mapping can have the effect of expanding the upper and lower regions of the equirectangular video frame 400 towards the top and bottom (e.g., the "north pole" and "south pole", respectively) of the spherical representation. Expanding the upper and lower regions can correct distortion in these areas that is apparent in the equirectangular video frame 400.

Mapping the equirectangular video frame 400 to spherical representation 410 can further have the effect of wrapping the width of the frame around the center (e.g., the equator) of the spherical representation. The left and right edges of the equirectangular video frame 400 can be mapped next to each other, so that no "seam" appears.

Once the equirectangular video frame 400 has been mapped to a spherical representation, the spherical representation can be displayed. A viewer 420, using a head-mounted display or another 360-degree video display device, can view the spherical representation from within the spherical representation. In most cases, the viewer 420 is positioned such that the "ground," from the viewer's perspective, is the bottom-most point of the spherical representation. In some cases, it can be assumed that the user's eyes are at the center of the sphere. In various implementations, the spherical representation can be expanded or contracted to suit the viewer's height and/or position (e.g., if the viewer is sitting, standing, or in some other position).

As described above, one or more systems and methods described herein are directed to generating media files for 360-degree video content to include signaling information of one or more regions of interest (ROIs) in the video content. One or more systems and methods described herein are also directed to processing the signaling information included in the media files to extract the ROI from the video content for rendering.

As noted above, an ROI of a 360-degree video picture can be a pre-determined region of the picture capturing a certain portion of the scene. In such cases, a ROI can also be referred to as a most interested region. Generation and signaling of information related to ROIs can be performed using user-provided input, based on user statistics by a service or content provider, or using other suitable techniques. In various examples, an ROI determined for a picture can include a specifically-chosen portion of a 360-degree video content item that directs the audience's view, a statistically determined region of interest, or other pre-determined portion of a scene. For instance, a creator of the content (e.g., a director, a producer, an author, or the like) can define the most interested regions in a 360-degree video content item. In such an example, the playback of the 360-degree video may display the dynamically changing viewport that a director or other party wants the audience to focus on, even when the user is not turning his or her head or changing the viewport through another user interface (UI). Such viewports may be provided with an omnidirectional video scene-by-scene. In another example, ROIs in various pictures of a 360-degree video content item can be determined using the statistics of which regions have been requested and/or seen the most by users when certain 360-degree (or VR) video content was provided through a streaming service. In such an example, a ROI in a 360-degree video picture can include one of the regions that are statistically most likely to be rendered to the user at the presentation time of the picture.

Information on ROIs can be used for various 360-degree video performance-improving purposes. For example, ROI information can be used for data pre-fetching in 360-degree video adaptive streaming by edge servers, clients, and/or other entities. In another example, ROI information can be used for transcoding optimization when a VR video is transcoded (e.g., to a different codec, to a different projection mapping, or other transcoding operation). In other examples, ROI information can be used for cache management by an edge server or cache, content management by a 360-degree video streaming server, or other purposes. In some cases, signaling of ROIs can be performed, for example, by using SEI messages in a video bitstream, a file format sample group in a media file, a dynamic adaptive streaming over HTTP (DASH) media presentation description (MPD) elements or attributes (e.g., using a sample group), and/or other signaling mechanisms.

An ROI in a 360-degree video may be defined in at least two ways. For example, an ROI in a 360-degree video is to define an ROI based on the 2D Cartesian coordinate system on a 2D picture. Another way to define an ROI can be defined based on the sphere coordinate system (e.g., by defining a region on the spherical surface of the 360-degree video).

Figure 5B:
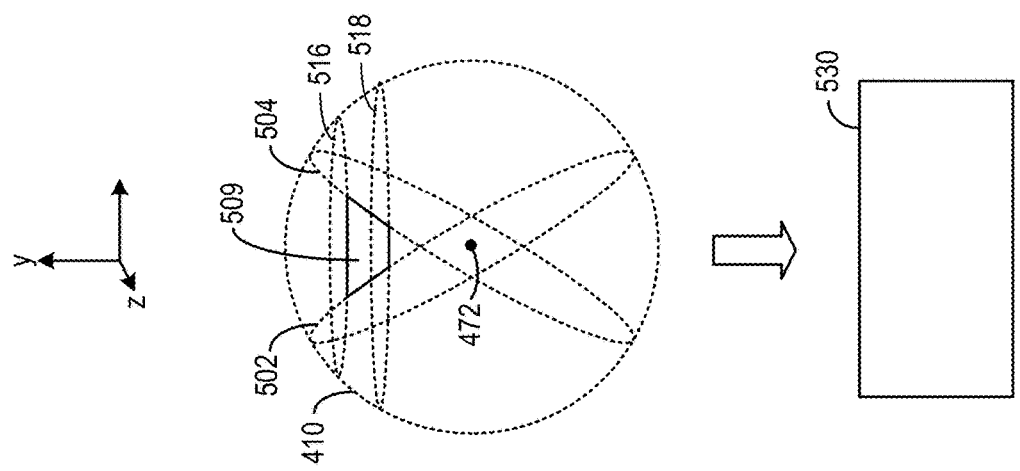
FIG. 5A, FIG. 5B, and FIG. 5C are diagrams illustrating examples of a viewport and definitions of an ROI, in accordance with some examples.
Figure 5A:
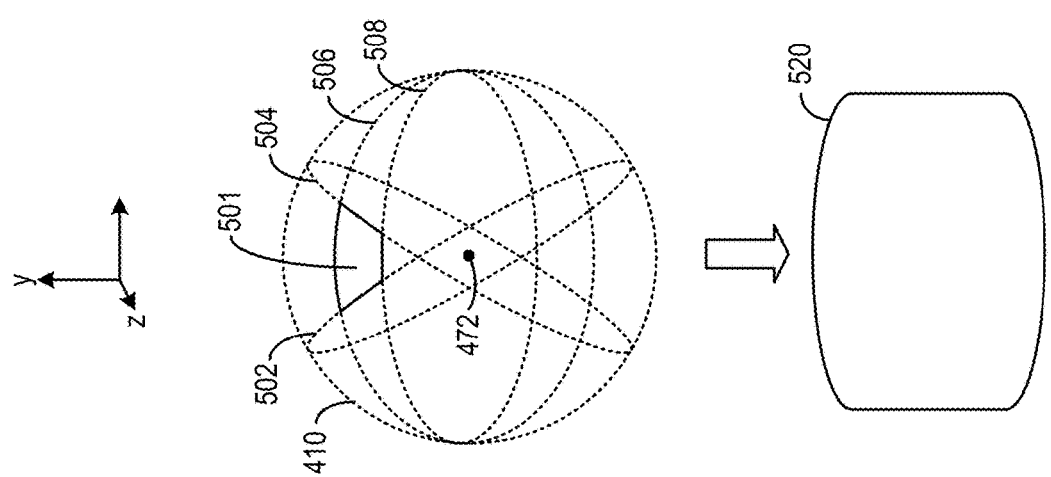

Several methods can be used to define ROIs based on the sphere coordinate system. For example, an ROI can be defined as a region on a spherical surface that is enclosed by the four segments of either four great circles, or enclosed by two great circles and two small circles, each segment between two points on the spherical surface. Herein a circle, great circle, and small circle are defined as follows (and are illustrated in FIG. 5A and FIG. 5B, described below): The intersection of plane and a sphere is a circle (except when the intersection is a point). All the points of this circle belong to the surface of the sphere. A great circle, also known as an orthodrome or Riemannian circle, of a sphere is the intersection of the sphere and a plane that passes through the center point of the sphere. The center of the sphere and the center of a great circle are always co-located. Any other intersection of a plane with a sphere that does not meet this condition may form a small circle.

When a 360-degree video is played back on a head mounted display (HMD) or a non-HMD display (e.g., a TV, a mobile device, a wearable device, or other suitable non-HMD display), a viewport is rendered to the user. A viewport can be a rectangular region on a plane that is tangent to the sphere (intersects with the sphere at a point), where the viewport plane is orthogonal to the user's viewing direction. A viewport can be generated by applying the rectilinear projection (e.g., as discussed in JVET-D1030). The region on the sphere that corresponds to a viewport is the one that is enclosed by the four segments of four great circles.

Various problems are present with respect to existing designs for signaling of ROIs in VR video. For example, problems can arise from signaling based only on either the sphere coordinate system (by signaling of a region on the sphere) or the 2D Cartesian coordinate system (by signaling of a region of a picture). Additional processing may be required to render and/or transmit spherical video data, which can affect the performance of the video processing system (e.g., video cache, media gateway, renderer, etc.) and can cause delay in the transmission and/or rendering of the video content, which can lead to poor user experience. For example, a sphere coordinate system based ROI signaling is beneficial from the rendering point of view, because for rendering of a particular sphere region (e.g., an object in the scene) that is of interest to the user, and if that sphere region is signaled, it can be easily identified and located on the entire spherical video scene. However, when such spherical based signaling is used for optimizations of delivery and decoding (e.g., in data prefetching in adaptive streaming, such as DASH), then a local cache or media gateway needs to figure out which set of the independently coded picture regions is the minimum set that covers the signaled ROI. To be able to do this, the cache or media gateway needs to perform the geometric processing involving the projection and region-wise mapping that were used in conversion of the sphere video signal into a 2D video signal before encoding. This would be a heavy processing burden for caches and media gateways. On the other hand, a 2D Cartesian coordinate system based ROI signaling is beneficial from the point of view of optimizations of delivery and decoding (e.g., in data prefetching in adaptive streaming, such as DASH), while it imposes a burden for rendering as players or renderers would need to apply the inverse geometric processing of the projection and region-wise mapping when it needs to figure out which region on the sphere is covered by the independently coded picture regions (that are signaled as the ROI).

Another issue is that, when an ROI based on the sphere coordinate system is signaled as a region on the sphere, in order to figure out the dimension(s) (e.g., width and height) of the viewport that corresponds to the region, a rectilinear projection may need to be applied. However, this information may be needed during session negotiation or content selection, while applying the rectilinear projection process to determine if the dimensions is a burden.

In some cases, issues can arise when the region on a spherical surface that is enclosed by the four segments of two great circles and two small circles does not correspond to the viewport. For example, a viewport may correspond to a non-rectangular region in a 2D equirectangular-projected picture (e.g., the entire viewport 520 shown in FIG. 5A), while the region on a spherical surface that is enclosed by the four segments of two great circles and two small circles may correspond to only a subset of a viewport region (e.g., only the rectangular region within the non-rectangular region of the viewport 520). In some cases, it is also possible that the rectangular region includes the non-rectangular region (the non-rectangular region is a subset of the rectangular region). However, the rectangular region and non-rectangular region may not ever match exactly with each other.

A media file generated for 360-degree video content using the systems and methods described herein may include first signaling information and second signaling information of the ROI. The first signaling information may include spherical information defining a first location of the ROI and dimension information of the ROI in a three-dimensional spherical space corresponding to the spherical video. The second signaling information may include 2D information defining a second location of the ROI in a two-dimensional space formed by projecting the spherical space onto a plane. In some examples, the dual signaling can provide a mapping between the first location and the second location of the ROI, which can facilitate both transmission and rendering of the spherical video data. For example, the spherical video data can be transmitted by a streaming application in the form of two-dimensional video frames. As described above, the two-dimensional video frames can be formed by performing a projection (e.g., equirectangular projection or other suitable projection) of the spherical video data onto a two-dimensional plane. To render an ROI based on, for example, a portion of the scene predetermined to be of interest (e.g., an instruction to render a director's cut, a statistically determined region, or other suitable information), a region corresponding to the ROI can be identified in the spherical video based on the first location. Moreover, via the mapping between the first location and the second location, the streaming application can determine which regions of the two-dimensional video frames to be prefetched for the rendering of the ROI. Further, after obtaining the regions of the two-dimensional video frames, a media player or renderer can identify pixels from the regions corresponding to the ROI based on, for example, the dimension information of the ROI, and can render the extracted pixels.

FIG. 4A is a diagram illustrating a region of interest (ROI) 430. The ROI 430 can comprise a subset of the pixels included in an equirectangular video frame 400. As described above, the ROI 430 may correspond to, for example, a pre-determined region of interest (ROI) to be presented as a current field of view (FOV) of viewer 420. The pre-determined ROI may correspond to, for example, a director's cut to guide viewer 420 through a pre-determined set of views of a scene, a statistically determined region of the frame, or the like. In some examples, the ROI 430 may also correspond to, for example, a direction of view of viewer 420 with respect to spherical representation 410, such that viewer 420 can control a portion of the scene to view.

ROI 430 can then be mapped to form a viewport to be rendered by the viewing device used by a viewer 420. A distinct feature of 360-degree video as compared to normal (non-360-degree or non-VR) video is that, in 360-degree video, typically only a subset of the entire video region represented by the video pictures (corresponding to the current field of view (FOV) or viewport of the viewing device) is displayed, while in normal video applications, typically the entire video region is displayed. The FOV or viewport is the area currently being presented by the display device and being seen by the user or observer.

FIG. 4B is a diagram illustrating an example of a viewport 460 corresponding to the ROI 430. Viewport 460 can be a region on a plane that is tangent to the spherical space that forms spherical representation 410. Viewport 460 can be formed by performing rectilinear projection of ROI 430 onto the plane. In the example of FIG. 4B, the viewport plane can intersect with the spherical space of spherical representation 410 at one point and can be orthogonal to the viewing direction of user 420.

Figure 4C:
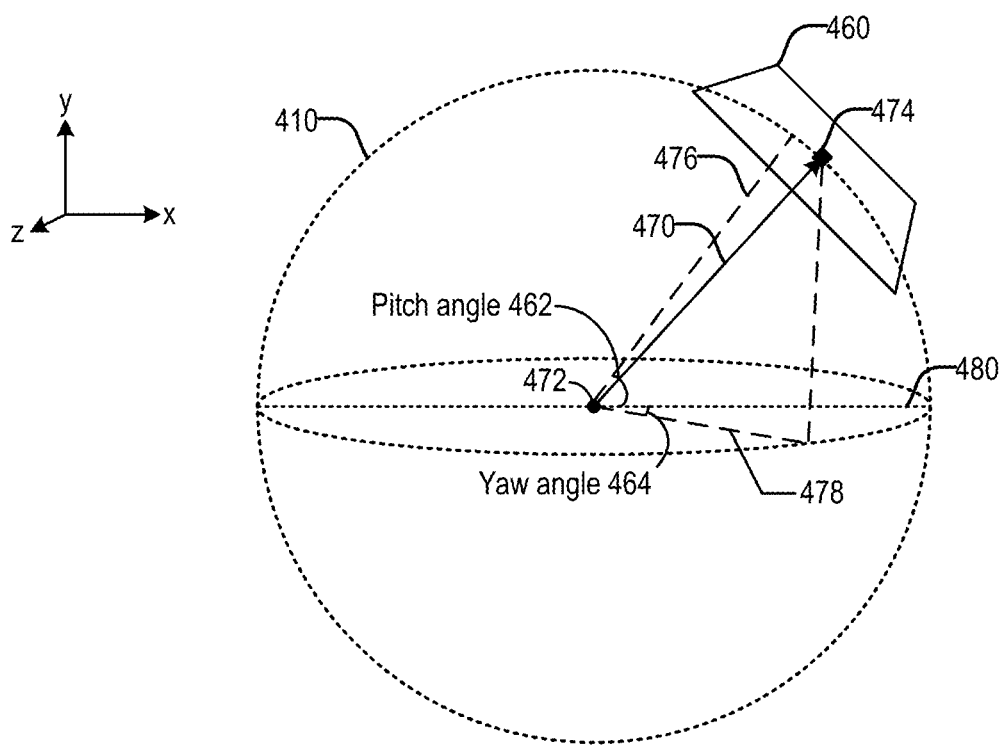

FIG. 4C is a diagram illustrating an example of representing a location of viewport 460 within the spherical space of spherical representation 410. In the example of FIG. 4C, the location of viewport 460 can be represented by a pitch angle 462 and a yaw angle 464. Both angles can be derived from a direction of view of the user based on the location of an ROI on the spherical scene. For example, a direction of view of the user positioned at spherical center 472 towards a viewport center 474 of the viewport 460 can be represented by a vector 470. Vector 470 may form a projection 476 on the x-z plane, and a projection 478 on the x-y plane. Pitch angle 462 can be formed between projection 476 and an axis 480 that is parallel with the y-axis. Yaw angle 464 can be formed between projection 478 and axis 480.

Both pitch angle 462 and yaw angle 464 can relate the location of viewport 460 with an orientation of the user's head and/or eyeballs. For example, pitch angle 462 can represent an elevation angle of vector 470, which can correspond to, for example, an angle of elevation of the user's head with respect to the x-z plane, a rotation of the user's eyeball with respect to the x-z plane, or any other movement of the user with respect to the x-z plane. Further, yaw angle 464 can represent a rotation angle of vector 470, which can correspond to, for example, an angle of rotation of the user's head, a rotation of the user's head with respect to the x-y plane, a rotation of the user's eyeball with respect to the x-y-plane, or any other movement of the user with respect to the x-z plane. By representing the location of viewport 460 based on pitch angle 462 and yaw angle 464, a location of region of interest (ROI) represented by viewport 460 can be determined efficiently based on the orientation of the user's head and/or eyeballs, which enables efficient rendering of the portion of spherical video content corresponding to the ROI.

Figure 4D:
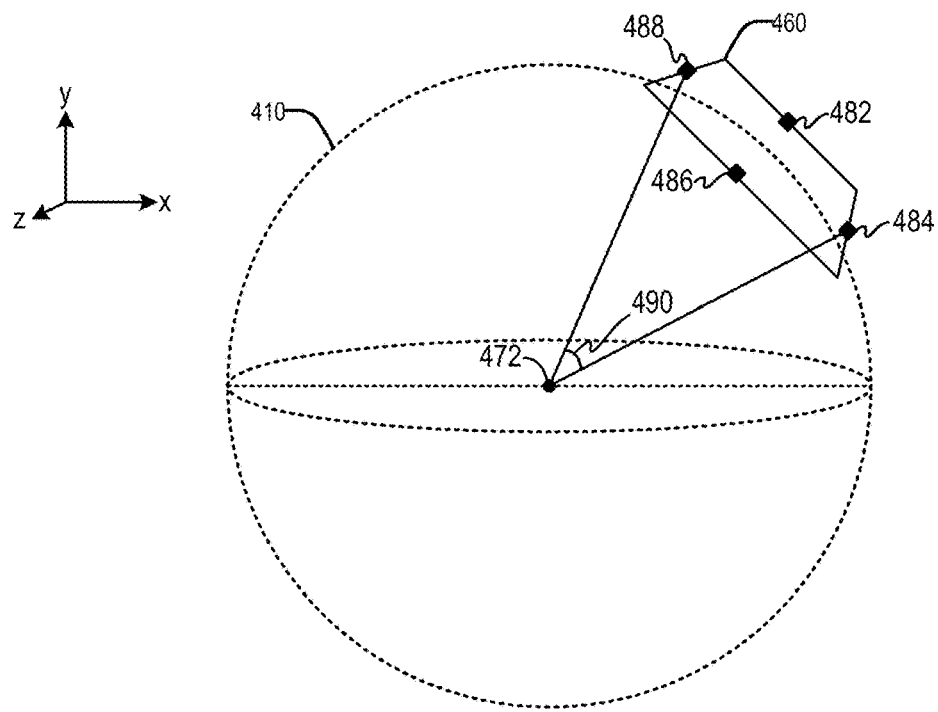
Figure 4E:
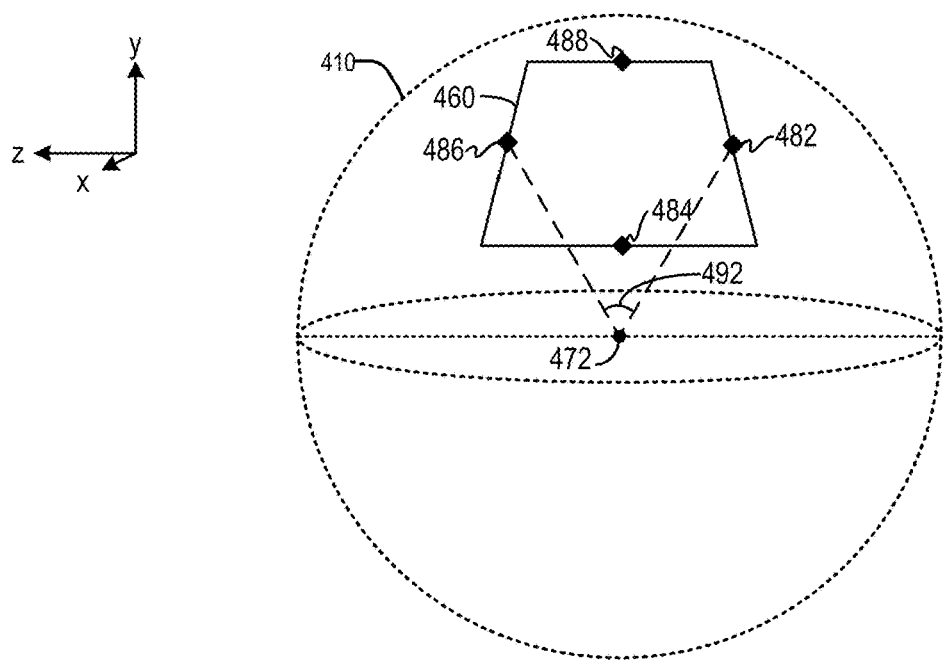

In addition to the center 474 of viewport 460, other attributes of viewport 460 can also be represented based on the yaw angle 464 and the pitch angle 462. For example, referring to FIG. 4E, midpoints 482, 484, 486, and 488 can be midpoints between the edges of viewport 460.

The distance between midpoints 484 and 488 may define, for example, a height of viewport 460, whereas the distance between midpoints 482 and 486 may define, for example, a width of viewport 460. The height of viewport 460 can be represented by a pitch delta angle 490 formed between spherical center 472, midpoint 484, and midpoint 488. Further, referring to FIG. 4E, which illustrates a different perspective of viewport 460 from FIGS. 4C-4D, the width of viewport 460 can also be represented by a yaw delta angle 492 formed between spherical center 472, midpoint 482, and midpoint 486. The location, height, and width of viewport 460 can represent a result of rectilinear projections of a pre-determined location, a pre-determined height, and a pre-determined width of ROI 430 on a plane corresponding to viewport 460.

Together with pitch angle 462 and yaw angle 464, pitch delta angle 490 and yaw delta angle 492 can define a location and a dimension of viewport 460 (and ROI) in the spherical space and based on an orientation of the user's head and/or eyeballs. As to be discussed in more detail below, the location and dimension information of viewport 460 can be part of first signaling information included in a media file. The media file may be, for example, an ISO based media file that encapsulate a bitstream of a set of two-dimensional video frames generated for rendering/transmission of the spherical video. The media file may also include a timed metadata track used for streaming the bitstream. The media file may also include second signaling information for certain region(s) of the two-dimensional video frames that include the ROI. The first signaling information and the second signaling information can be mapped together in the media file to signal the ROI. Based on the mapping, the regions of the two-dimensional video frame including the ROI can be pre-fetched and provided to the render. Moreover, the renderer can extract the pixels from the video frame regions representing the ROI based on the dimension information of viewport 460, and render the pixels for display. As a result, additional processing (e.g., performing rectilinear projection or an inverse rectilinear projection) can be reduced, which can improve the performance of the video processing system as well as user experience.

Figure 5C:
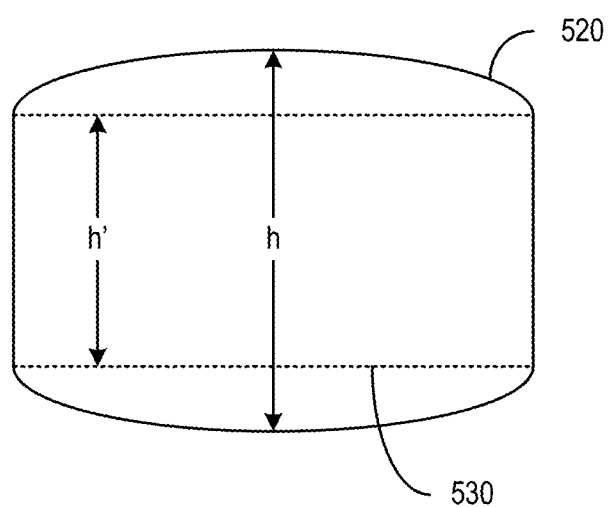

Although FIGS. 4A-4E illustrate that the viewport 460 has a rectangular shape, a viewport can have other shapes. The shape of a viewport can be determined based on how a region corresponding to a viewport (e.g., ROI 430) is geometrically defined in the spherical representation 410. Reference is now made to FIGS. 5A-5C, which illustrate different geometric definitions of ROI 430. In FIG. 5A, region 501 can be defined by circles 502, 504, 506, and 508. Each of the circles 502, 504, 506, and 508 can be referred to as a "great circle." Each of the circles 502, 504, 506, and 508 can be formed by intersection of the spherical space of spherical representation 410 and a plane that passes through spherical center 472. In FIG. 5B, region 509 can be defined by circles 502 and 504 and circles 516 and 518. As discussed above, circles 502 and 504 can be referred to as great circles. In contrast, circles 516 and 518 are referred to as "small circles," which can be formed by intersection of the spherical space of spherical representation 410 and a plane that does not pass through spherical center 472.

The geometric definition of the ROI 430 (e.g., whether defined by four great circles or by two great circles and two small circles) can determine the shape and dimension of the corresponding viewports. Reference is now made to FIG. 5C, which illustrates a comparison between viewport 520 and rectangular region 530. As shown in FIG. 5C, rectangular region 530 is smaller and includes fewer pixels than viewport 520. A larger viewport is preferable because that is what corresponds to what can be seen from an HMD or other displays, and for example, more pixels can be displayed to the user. In some implementations, to maximize the number of pixels provided to a user in a viewport, an ROI is signaled in a media file only if the region corresponding to the ROI is formed only by the great circles. Such a restriction can also improve uniformity and predictability in the rendering of the viewport. For example, referring to FIG. 5C, a renderer can render the viewport in the shape of viewport 520 instead of rectangular region 530, and interpret, for example, the viewport height (e.g., represented by the pitch delta angle) as representing the height h between the top and bottom curved edges of viewport 520 rather than the height h' between the top and bottom straight line edges of rectangular region 530.

Figure 6A:
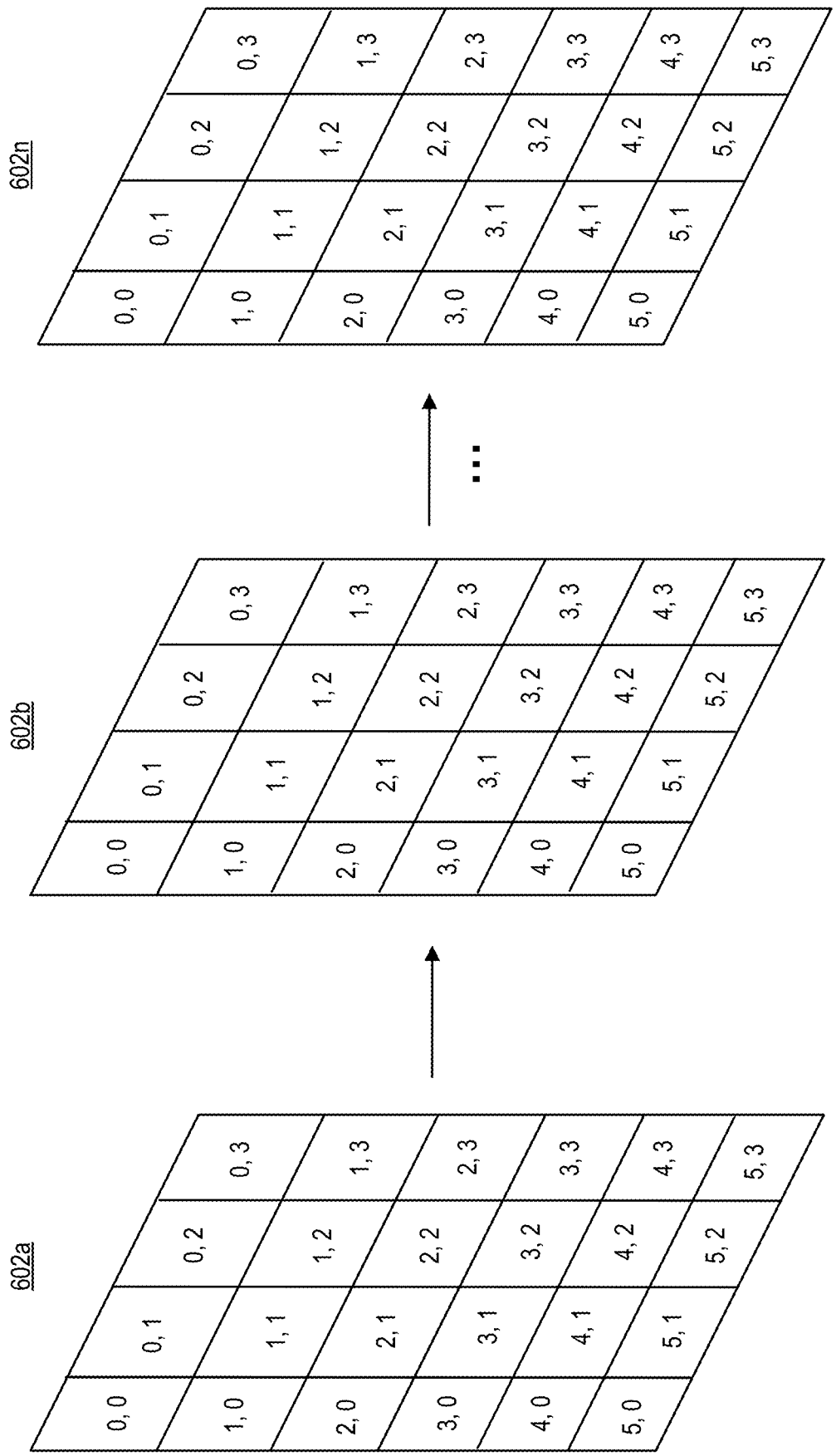
FIG. 6A and FIG. 6B illustrate examples of two-dimensional video frames and signaling of a viewport for an ROI in the two-dimensional video frames.

FIG. 6A illustrates a set of two-dimensional video frames 602a, 602b through 602n. Each of two-dimensional video frames 602a, 602b through 602n corresponds to a video frame of spherical representation 410. Each two-dimensional video frames 602a, 602b through 602n can be formed by performing, for example, rectilinear projection of the corresponding video frame of spherical representation 410 onto a two-dimensional plane. The two-dimensional video frames 602a, 602b through 602n can be encoded into a video bitstream for transmission.

Figure 6B:
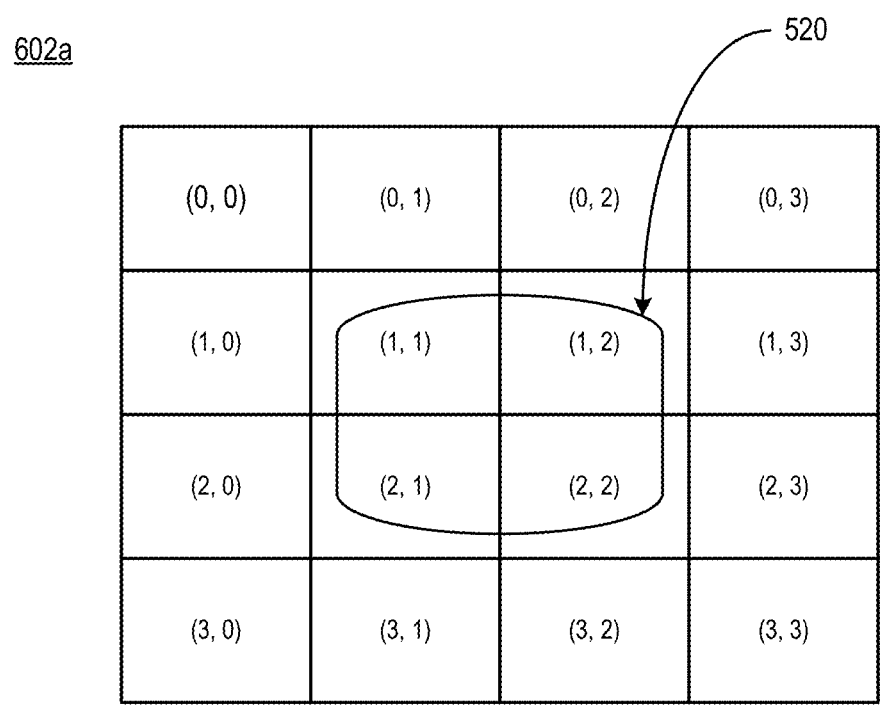

Each of two-dimensional video frames 602a, 602b through 602n may be divided into a set of tiles. The tiles in the video frames 602a, 602b through 602n can be motion-constrained tiles and all pictures in a layer can have the same tile structure. In such cases, the tiles have the same location across all frames of a given layer of the bitstream. For example, a motion-constrained tile is a tile region at a particular location in a picture (or frame) that can only be coded using one or more tiles at the same location in other pictures. For instance, only the region of a reference picture that is within a particular tile location can be used to encode or decode a tile at that particular tile location in a current picture. Only the tiles of the pictures that are required to display a current viewport of a display device can be provided for display. As shown in FIG. 6A, each tile has a designated location across the different video frames 602a, 602b through 602n. In one example, a first tile has a location of (0, 0) in the 602a, 602b through 602n, and the first tile can be identified based on the location. In some cases, the tiles can be numbered, such as tile numbers 0-23, tile numbers 1-24, or other suitable numbering. As shown in FIG. 6, the tiles do not overlap with one another. Each of the two-dimensional video frames 602a, 602b through 602n may also include one or more ROIs (or viewports) projected from a corresponding frame of spherical representation 410. For example, as shown in FIG. 6B, viewport 520 may be located in a group of tiles at the locations (1, 1), (1, 2), (2, 1), and (2, 2).

As discussed above, a media file can be generated to encapsulate a bitstream formed by encoding video frames 602a, 602b through 602n. A media file can also be generated to include a timed metadata track (in addition to track(s) that carry the media bitstream) used for streaming the bitstream. The media file may include the first signaling information and the second signaling information described above for an ROI (corresponding to a viewport) to facilitate transmission and rendering of the ROI/viewport. The first signaling information may include a location and a dimension of the viewport in the spherical space (e.g., represented by the yaw angle, pitch angle, yaw delta angle, and pitch delta angle). The second signaling information may include a location of the viewport in the two-dimensional video frames. The location of the viewport in the two-dimensional video frames can be represented by, for example, the locations (or identifiers) of the tiles that include the viewport. For the example of FIG. 6B, the second signaling information may include the tile locations (1, 1), (1, 2), (2, 1), and (2, 2) (or the identifiers/numbers associated with these tiles) to signal the ROI.

As discussed above, the first signaling information and the second signaling information can be mapped together in the media file to signal the ROI. The mapping enables efficient transmission and rendering of the viewport to the user. For example, a video processing system can receive an instruction to render a pre-determined region of interest in the spherical video 410 to the user. The instruction can include, for example, the yaw angle and pitch angle of the center of the specific region. Based on the input yaw angle and pitch angle in the first signaling information, the video processing system can refer to the mapping between the first signaling information and the second signaling information in the media file to determine the set of tiles (or other units) of pixels in video frame 602a that contains, for example, viewport 520. Moreover, based on the pitch angle, the yaw angle, the pitch delta angle, the yaw delta angle, and a determination that of a particular shape of the viewport (e.g., based on the restriction that the pre-determined region in spherical video 410 is defined based on four great circles), a renderer can also determine a location and a boundary of viewport 520 within the tiles, and extract pixels within the boundary of viewport 520 for rendering. Such processing can be performed with minimum geometric processing, which can improve the performance of the system as well as user experience.

Figure 7:
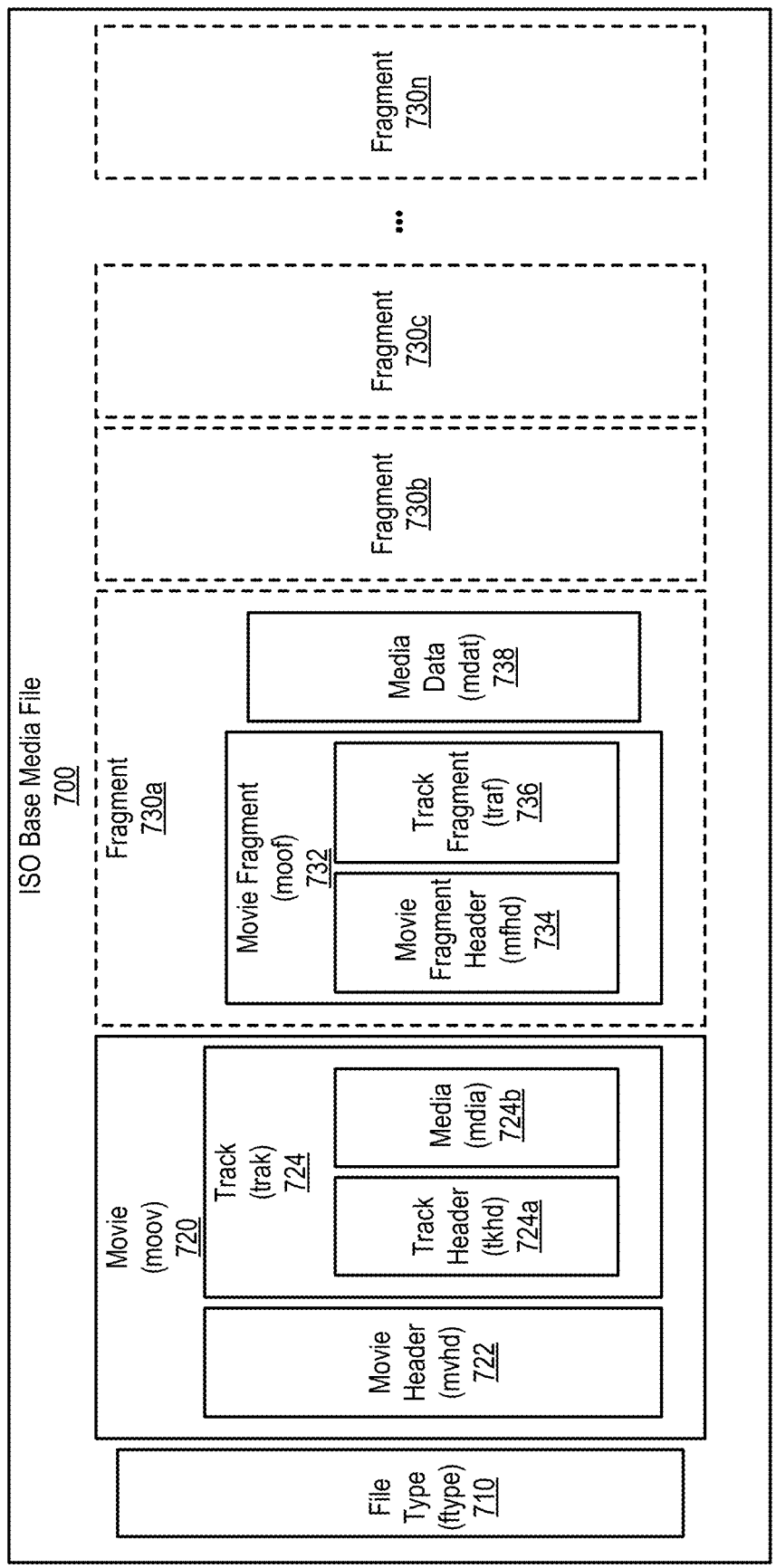
FIG. 7 and FIG. 8 provide examples of a media file that contains signaling information of a viewport, in accordance with some examples.

Reference is now made to FIG. 7, which illustrates an example of an ISO base media file 700 that contains signaling information of ROI. File 700 can be formatted according to the ISOBMFF. The ISOBMFF is designed to contain timed media information in a flexible and extensible format that facilitates interchange, management, editing, and presentation of the media. Presentation of the media may be "local" to the system containing the presentation or the presentation may be via a network or other stream delivery mechanism.

A "presentation," as defined by the ISOBMFF specification, is a sequence of pictures, often related by having been captured sequentially by a video capture device, or related for some other reason. Herein, a presentation may also be referred to as a movie or a video presentation. A presentation may include audio. A single presentation may be contained in one or more files, with one file containing the metadata for the whole presentation. The metadata includes information such as timing and framing data, descriptors, pointers, parameters, and other information that describes the presentation. Metadata does not include the video and/or audio data itself. Files other than the file that contains the metadata need not be formatted according to the ISOBMFF, and need only be formatted such that these files can be referenced by the metadata.

The file structure of an ISO base media file is object-oriented, and the structure of an individual object in the file can be inferred directly from the object's type. The objects in an ISO base media file are referred to as "boxes" by the ISOBMFF specification. An ISO base media file is structured as a sequence of boxes, which can contain other boxes. Boxes generally include a header that provides a size and a type for the box. The size describes the entire size of the box, including the header, fields, and all boxes contained within the box. Boxes with a type that is not recognized by a player device are typically ignored and skipped.

As illustrated by the example of FIG. 7, at the top level of the file, an ISO base media file 700 can include a file type box 710, a movie box 720, and one or more movie fragment boxes 730a, 730b . . . 730n. Other boxes that can be included at this level but that are not represented in this example include free space boxes, metadata boxes, and media data boxes, among others.

An ISO base media file can include a file type box 710, identified by the box type "ftyp." The file type box 710 identifies an ISOBMFF specification that is the most suitable for parsing the file. "Most" in this instance means that the ISO base media file 700 may have been formatted according to a particular ISOBMFF specification, but is likely compatible with other iterations of the specification. This most suitable specification is referred to as the major brand. A player device can use the major brand to determine whether the device is capable of decoding and displaying the contents of the file. File type box 710 can also include a version number, which can be used to indicate a version of the ISOBMFF specification. File type box 710 can also include a list of compatible brands, which includes a list of others brands with which the file is compatible. An ISO base media file can be compatible with more than one major brand.

An ISO base media file can further include a movie box 720, which contains the metadata for the presentation. Movie box 720 is identified by the box type "moov." ISO/IEC 14496-12 provides that a presentation, whether contained in one file or multiple files, can include only one movie box 720. Frequently, movie box 720 is near the beginning of an ISO base media file. Movie box 720 includes a movie header box 722, and can include one or more track boxes 724 as well as other boxes.

Movie header box 722, identified by the box type "mvhd," can include information that is media-independent and relevant to the presentation as a whole. For example, movie header box 722 can include information such as a creation time, a modification time, a timescale, and/or a duration for the presentation, among other things. Movie header box 722 can also include an identifier that identifies the next track in the presentation. For example, the identifier can point to track box 724 contained by movie box 720 in the illustrated example.

Track box 724, identified by the box type "trak," can contain the information for a track for a presentation. A presentation can include one or more tracks, where each track is independent of other tracks in the presentation. Each track can include the temporal and spatial information that is specific to the content in the track, and each track can be associated with a media box. The data in a track can be media data, in which case the track is a media track, or the data can be packetization information for streaming protocols, in which case the track is a hint track. Media data includes, for example, video and audio data. In the illustrated example, the example track box 724 includes a track header box 724a and a media box 724b. A track box can include other boxes, such as a track reference box, a track group box, an edit box, a user data box, a meta box, and others. As to be discussed in details below, media box 724b may include the signaling information of one or more ROIs.

Track header box 724a, identified by the box type "tkhd," can specify the characteristics of a track contained in track box 724. For example, track header box 724a can include a creation time, modification time, duration, track identifier, layer identifier, group identifier, volume, width, and/or height of the track, among other things. For a media track, track header box 724a can further identify whether the track is enabled, whether the track should be played as part of the presentation, or whether the track can be used to preview the presentation, among other things. Presentation of a track is generally assumed to be at the beginning of a presentation. Track box 724 can include an edit list box, not illustrated here, that can include an explicit timeline map. The timeline map can specify, among other things, an offset time for the track, where the offset indicates a start time, after the beginning of the presentation, for the track.

In the illustrated example, track box 724 also includes a media box 724b, identified by the box type "mdia." Media box 724b can contain the objects and information about the media data in the track. For example, media box 724b can contain a handler reference box, which can identify the media type of the track and the process by which the media in the track is presented. As another example, the media box 724b can contain a media information box, which can specify the characteristics of the media in the track. The media information box can further include a table of samples, where each sample describes a chunk of media data (e.g., video or audio data) including, for example, the location of the data for the sample. The data for a sample is stored in a media data box, discussed further below. As with most other boxes, media box 724b can also include a media header box.

In the illustrated example, the example ISO base media file 700 also includes multiple fragments 730a, 730b, . . . 730n of the presentation. The fragments 730a, 730b, . . . 730n are not ISOBMFF boxes, but rather describe a combination of boxes including a movie fragment box 732 and one or more media data boxes 738 that is referenced by the movie fragment box 732. Movie fragment box 732 and media data boxes 738 are top-level boxes, but are grouped here to indicate the relationship between a movie fragment box 732 and a media data box 738.

Movie fragment header box 734, identified by the box type "mfhd," can include a sequence number. A player device can use the sequence number to verify that the fragment 730a includes the next piece of data for the presentation. In some cases, the contents of a file, or the files for a presentation, can be provided to a player device out of order. For example, network packets can frequently arrive in an order other than in the order that the packets were originally transmitted. In these cases, the sequence number can assist a player device in determining the correct order for fragments.

The movie fragment box 732 can also include one or more track fragment boxes 736, identified by the box type "traf" A movie fragment box 732 can include a set of track fragments, zero or more per track. The track fragments can contain zero or more track runs, each of which describes a contiguous run of samples for a track. Track fragments can be used to add empty time to a track, in addition to adding samples to the track.

Media data box 738, identified by the box type "mdat," contains media data. In video tracks, media data box 738 would contain video frames. A media data box can alternatively or additionally include audio data. A presentation can include zero or more media data boxes, contained in one or more individual files. The media data is described by metadata. In the illustrated example, the media data in the media data box 738 can be described by metadata included in the track fragment box 736. In other examples, the media data in a media data box can be described by metadata in the movie box 720. The metadata can refer to a particular media data by an absolute offset within the file 700, such that a media data header and/or free space within the media data box 738 can be skipped.

Other fragments 730b, 730c, 730n in the ISO base media file 700 can contain boxes similar to those illustrated for the first fragment 730a, and/or can contain other boxes.

Figure 8:
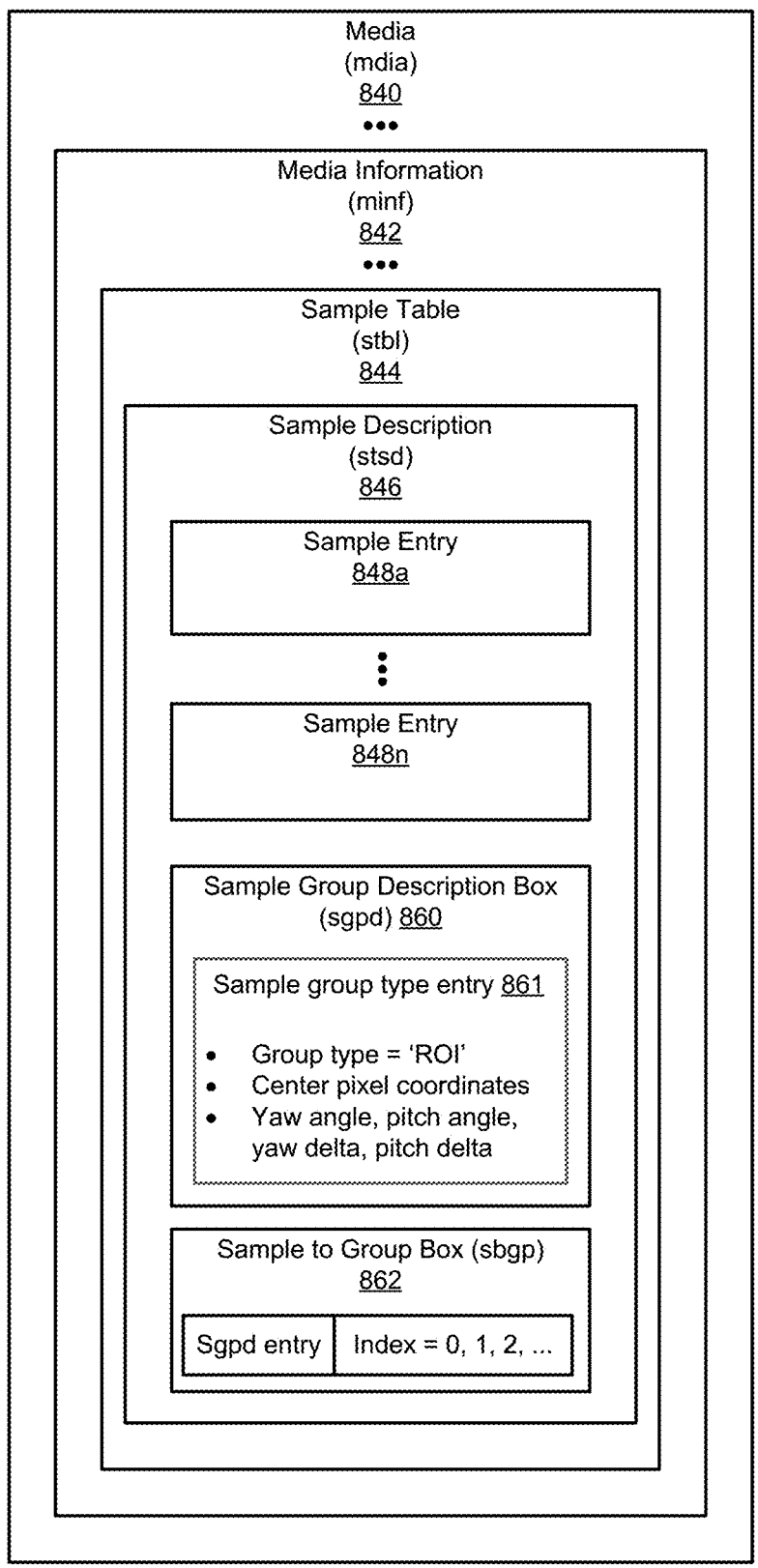

FIG. 8 illustrates an example of a media box 840 that can be included in an ISO base media file. As discussed above, a media box can be included in a track box, and can contain objects and information that describe media data in the track. In the illustrated example, media box 840 includes a media information box 842. Media box 840 can also include other boxes, which are not illustrated here.

Media information box 842 can contain objects that describe characteristic information about the media in the track. For example, media information box 842 can include a data information box, which describes the location of media information in the track. As another example, media information box 842 can include a video media header, when the track includes video data. The video media header can contain general presentation information that is independent of the coding of the video media. Media information box 842 can also include a sound media header when the track includes audio data.

The media information box 842 can also include a sample table box 844, as provided in the illustrated example. Sample table box 844, identified by the box type "stbl," can provide locations (e.g., locations with a file) for the media samples in the track, as well as time information for the samples. Using the information provided by the sample table box 844, a player device can locate samples in correct time order, determine the type of a sample, and/or determine the size, container, and offset of a sample within a container, among other things.

Sample table box 844 can include a sample description box 846, identified by box type "stsd." Sample description box 846 can provide detailed information about, for example, the coding type used for a sample, and any initialization information needed for that coding type. The information stored in the sample description box can be specific to a type of the track that includes the samples. For example, one format may be used for the sample description when the track is a video track and a different format may be used when the track is a hint track. As a further example, the format for the sample description may also vary depending on the format of the hint track.

Sample description box 846 can include sample entry boxes 848a . . . 848n. The sample entry is an abstract class, and thus typically the sample description box includes a specific sample entry box, such as a visual sample entry for video data or an audio sample entry for audio samples, among other examples. Each visual sample entry for video data may include one or more video frames. The video frames can be, for example, two-dimensional video frames 602a, 602b through 602n generated from spherical representation 410. A sample entry box can store the parameters for a particular sample. For example, for a video sample, the sample entry box can include a width, height, horizontal resolution, vertical resolution, frame count, and/or depth for the video sample, among other things. As another example, for an audio sample, the sample entry can include a channel count, a channel layout, and/or a sampling rate, among other things.

In addition to the sample entry boxes, sample description 846 may further include a sample group description box 860 (identified by the sample group description box type "sgpd") and a sample to group box 862 (identified by the sample to group box type "sbgp"). Both sample group description box 860 and sample to group box 862 can be part of a sample grouping mechanism to signal that a set of sample entries include one or more ROIs, and to signal the locations and dimensions of the one or more ROIs in the set of sample entries. In the example of FIG. 8, sample group description box 860 may include a sample group type entry 861. Sample group type entry 861 may include a group type "ROI" to signal that the type entry includes ROI information. Sample group type entry 861 may further include syntax elements indicating the pixel coordinates of the ROI in a two-dimensional video frame, as well as a yaw angle, a pitch angle, a yaw delta angle, and a pitch delta angle of the ROI in the spherical space. Sample to group box 862 further indicates that the ROI information in sample group type entry 861 is to be applied to certain sample entries in sample description 846. With this information, the video samples containing the ROI can be more efficiently identified and provided to the renderer for rendering.

Some video systems support streaming media data over a network, in addition to supporting local playback of the media. For example, one or more ISO base media file format files (e.g., ISOBMFF). The media file can include a movie presentation and can include hint tracks, which contain instructions that can assist a streaming server in forming and transmitting the file or files as packets. These instructions can include, for example, data for the server to send (e.g., header information) or references to segments of the media data. A file can include separate hint tracks for different streaming protocols. Hint tracks can also be added to a file without needing to reformat the file.

Figure 9:
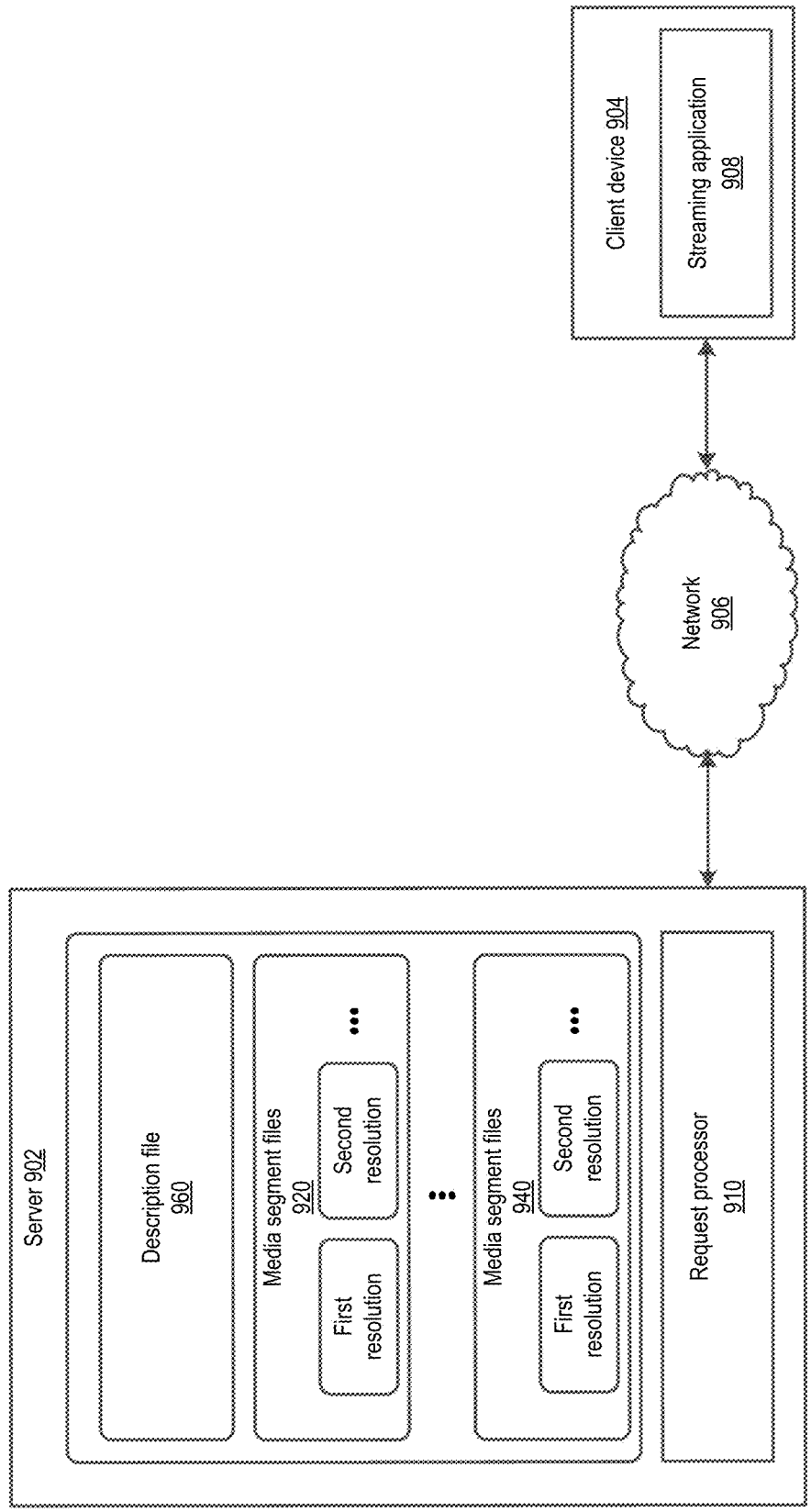
FIG. 9 is a diagram illustrating a media streaming system, in according with some examples.

Reference is now made to FIG. 9, which illustrates an example system 900 for streaming. System 900 includes a server 902 and a client device 904 communicatively coupled with each other over network 906 based on a networking protocol. For example, server 902 can include a conventional HTTP web server, and client device 904 may include a conventional HTTP client. An HTTP communication channel can be established, in which client device 904 can transmit an HTTP request to server 902 to request one or more network resources. The server 902 can transmit a HTTP response back to client device 904 including the requested network resource(s). One example of a network resource hosted by server 902 can be media content, which can be divided into media segments. A media segment can include a sequence of video frames. Client device 904 may include a streaming application 908 to establish a streaming session with server 902 over network 906. During the streaming session, streaming application 908 can transmit a request for one or more media segments to a request processor 910 of server 902 over network 906. The streaming application 908 can receive the requested one or more media segments, and can render some or all of the received media segments on client device 904, before transmitting a subsequent request for other media segments. Using such HTTP streaming, the streaming application 908 does not need to wait until the entire media content has been completely downloaded before rendering the media content at client device 904, which can facilitate better utilization of the network resources and improve user experience.

To enable high quality streaming of media content using conventional HTTP web servers, adaptive bitrate streaming can be used. With adaptive bitrate streaming, for each media segment, client device 904 can be provided with information about a set of alternative segment files 920 and 940. Here, a media segment may refer to a portion of a media bitstream associated with a particular playing timestamp and duration. Each set of alternative segment files 920 and 940 may correspond to a particular representation of the media segment (e.g., associated with a particular playing timestamp and duration). A representation may refer to a particular result of encoding certain media content with different qualities (e.g., with a different bitrate, frame rate, or the like). Among each set of media segment files, each media segment file can be associated with a set of properties including, for example, a particular bitrate, frame rate, resolution, audio language, or the like. Based on local information (e.g., bandwidth of network 906, decoding/displaying capabilities of client device 904, user preference, or other information), the streaming application 908 can select, for each representation, a particular media segment file from the set. As an illustrative example, client device 904 can transmit a request for a media segment file that is associated with a first resolution from media segment files 920. Subsequently, due to a change in the bandwidth of the network 906, the client device 904 may transmit another request for a media segment file associated with a second resolution.

The information about the set of alternative segment files 920 and 940 can be part of a description file 960 (or manifest file) maintained by the server 902. Client device 904 can obtain the description file 960 from the server 902, and can transmit requests for the media segment files based on description file 960. Description file 960 may include, for example, a list of a set of alternative media segment files for each representation of the media content, and the properties associated with each alternative media segment file (e.g., bitrate, frame rate, resolution, audio language, etc.). The description file 960 can also include location identifiers (e.g., Uniform Resource Locator (URL), Uniform Resource Indicator (URI), etc.) associated with the storage locations of the alternative media segment files.

Figure 10:
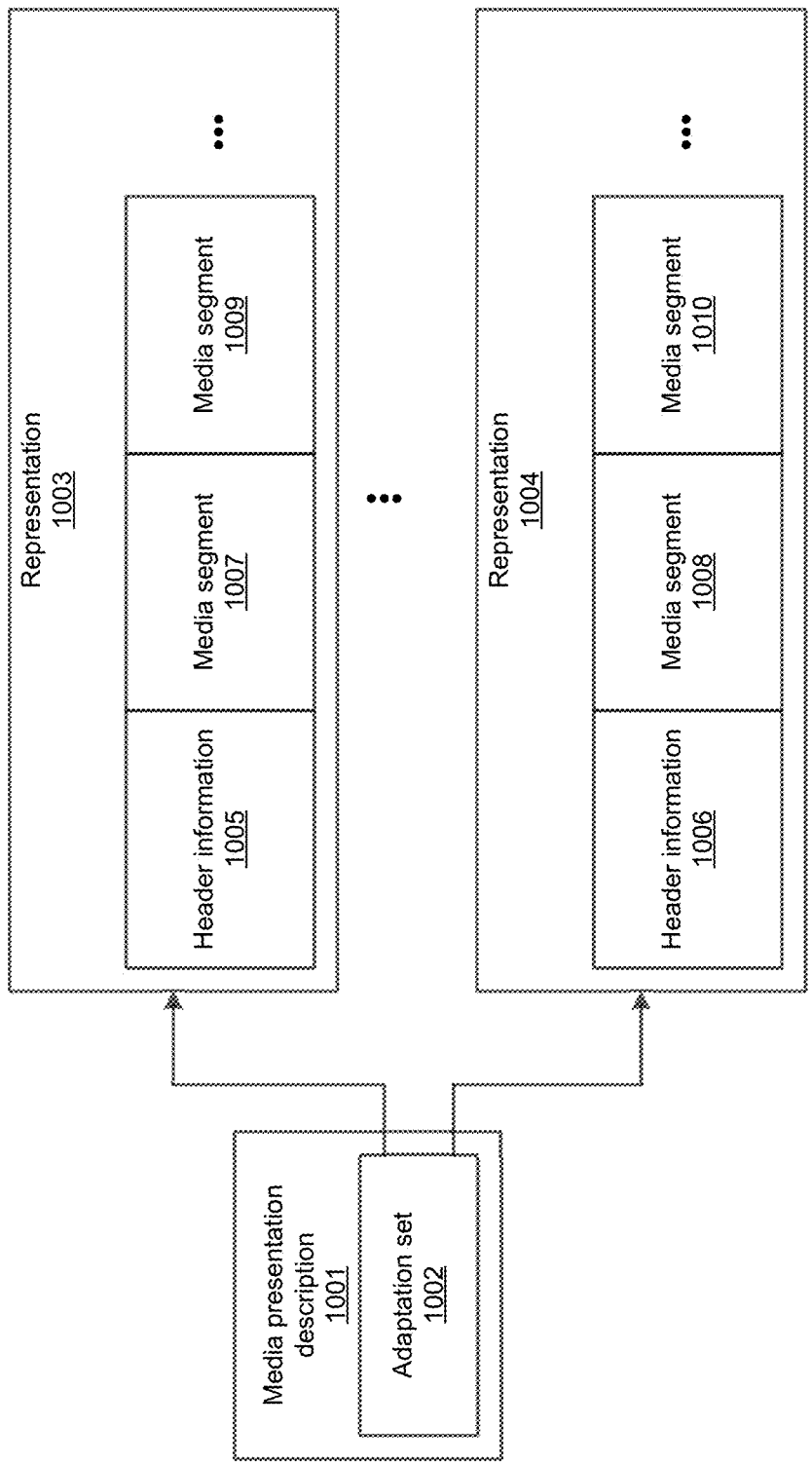
FIG. 10 provides a graphical representation of an example of an MPD file, in accordance with some examples.

Various protocols exist for adaptive bitrate streaming. One example is Dynamic Adaptive Streaming over HyperText Transfer Protocol (HTTP), or DASH (defined in ISO/IEC 23009-1:2014). DASH, which is also known as MPEG-DASH. Under DASH, the description file 960 can include a media presentation description (MPD). FIG. 10 is a diagram illustrating an example of an MPD 1001. In some cases, the MPD 1001 can be represented in Extensible Markup Language (XML). The MPD 1001 can include a set of elements that define an adaptation set 1002. The adaptation set 1002 can include a set of alternative representations 1003 and 1004. One of ordinary skill will appreciate that the adaptation set 1002 can include additional representations in addition to the representations 1003 and 1004. Each alternative representation 1003 and 1004 can be associated with a particular bitrate, resolution, or other quality, and can include a set of media segments. For example, the representation 1003 includes media segments 1007 and 1009, and also header information 1005. The representation 1004 includes media segments 1008 and 1010, and also header information 1006. The header information 1005 and 1006 may include, for example, the "Representation" element (e.g., including identifier, bandwidth, width and height attributes, or the like). Each of the media segments 1007 and 1009 may be associated in the MPD 1001 with a URL of a media segment file, which can be denoted as the element "SegmentURL." Each of the set of elements in the MPD 1001 may be associated with a set of attributes which define the properties of, for example, the adaptation set 1002, the representations 1003 and/or 1004, or other information.

Below is an example of part of an MPD:

```
<AdaptationSet mimeType="video/mp2t">
    <Representation id="720p" bandwidth="3200000"
    width="1280" height="720">
    ...
    <SegmentURL media="segment-1.DASH"/>
    <SegmentURL media="segment-2.DASH"/>
    ...
```

In the example MPD shown above, texts such as "Period", "AdaptationSet", "Representation", "SegmentURL", etc. are elements, whereas "mimeType", "id", "bandwidth", "width" and "height", "media", etc. are attributes. In this example, the adaptation set includes one representation associated with a particular bandwidth and frame size, and includes a set of media segments represented by their URLs.

An MPD file may include signaling information for ROI. Reference is now made to FIG. 11, which illustrates an XML code representation illustrating an example of an MPD 1100. MPD 1100 may include a listing of at least one adaptation set. In MPD 1100, an adaptation set may include elements to define multiple alternative representations associated with different bitrates, resolutions, or other qualities. Each representation may be associated with a picture file, and MPD 1100 may include a link (e.g., a universal resource locator (URL), a universal resource indicator (URI), or any other suitable information) for locating the picture file for each of the representation elements. In a case where the picture file associated with a representation includes an ROI, the representation elements may further include the first signaling information and the second signaling information associated with the ROI.

As shown, an adaptation set is defined to include multiple representations, including the a representation having a representation ID equal to 1 and a representation having a representation ID equal to 2. MPD 1100 indicates that the representation with representation ID of 2 has a width of 3840 pixels, a height of 1920 pixels, a frame rate of 60, among other characteristics. MPD 1100 further includes an URL for video file "video1.mp4" for the representation. An EssentialProperty element 1102 is provided for the representation with representation ID of 2. EssentialProperty element 1102 can describe information about projection types, FOV directions, region-wise mapping, and/or other information. For example, this information can be contained in the MPD 1100 by using EssentialProperty, in which case a different schemeIdUri can be defined for each information type. In one illustrative example, if schemeIdUri "urn:mpeg:dash:360VideoProjection:2017" is associated with projection type and "CMP" means cubemap projection, then we can define information about the cubemap projection type in the EssentialProperty element as follows: <EssentialProperty schemeIdUri="urn:mpeg: dash:360VideoProjection:2017" value="CMP"/>.

Moreover, SupplementalProperty element 1104 may contain signaling information of an ROI. For example, schemeIdUri "urn:mpeg:dash:ROIpixelrep:2017" may be associated with a set of values to signal a center location and a dimension of an ROI in a two-dimensional frame. The location and dimension can be represented in pixel coordinates. In the example of FIG. 11, the center location of the ROI can be (1300, 500), which indicates that the left offset of the center location is 1300 pixels, and the top offset of the center location is 500 pixels. Moreover, the ROI spans a width of 100 pixels and a height of 200 pixels. Although in the example of FIG. 11 the location and dimension are represented in pixel coordinates, it is understood that they can be represented in other forms, such as tiles. For example, the location and dimension can be signaled by listing the tiles that include the ROI, or a group identifier associated with a group of tiles that include the ROI.

Further, schemeIdUri "urwmpeg:dash:ROIsphererep:2017" may be associated with a set of values to signal a center location and a dimension of an ROI in the spherical space. In the example of FIG. 11, the yaw angle of the ROI can be 20 radians, the pitch angle of the ROI can be 30 radians, the pitch delta angle of the ROI can be 10 radians, whereas the yaw delta angle of the ROI can be 10 radians.

With MPD 1100, a system can fetch the video file "video1.mp4" and decode the file based on the indication that the ROI is included in the video file. The system can also extract the pixels from the decoded file according to the signaling information, and provide the extracted pixels to the renderer for rendering.

Figure 12:
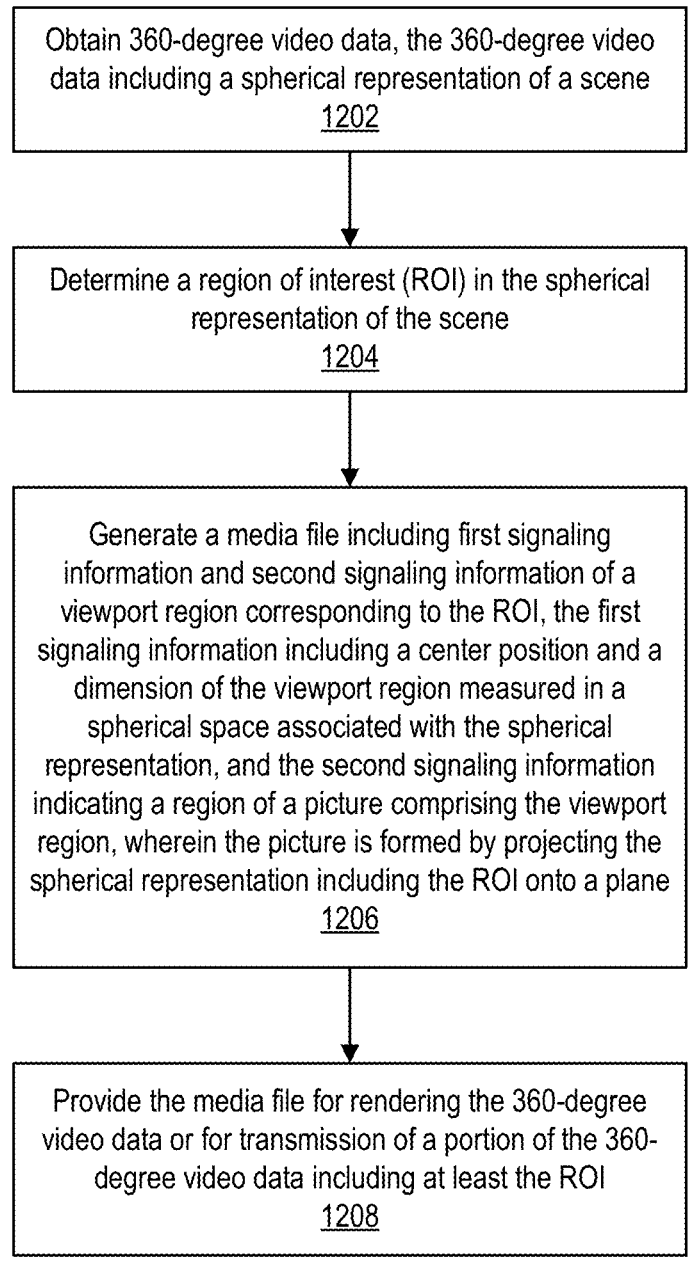

FIG. 12 is a flowchart illustrating an example of a process 1200 for generating a media file. The process can be performed by, for example, a streaming server (e.g., server 902 of FIG. 9), an intermediate network device between a hosting server and a receiver device, etc., that encapsulates encoded data in an ISO base media file (e.g., an ISOBMFF file).

At 1202, process 1200 includes obtaining 360-degree video data, the 360-degree video data including a spherical representation of a scene. The 360-degree video data can be generated by a camera set (e.g., omnidirectional cameras). The spherical representation can be formed by, for example, stitching a set of images captured by the camera set at a particular time point.

At 1204, process 1200 includes determining a region of interest (ROI) in the spherical representation of the scene. The determination can be based on, for example, an instruction to output a particular portion of the scene to a user (e.g., as part of a director's cut), a direction of sight of the user, or based on other suitable information. In some examples, The ROI can be defined by at least four planes that intersect with the spherical representation; and wherein each of the four planes also intersects with the spherical center to form a great circle. For example, referring back to FIG. 5A, the ROI can be defined by four great circles 502, 504, 506, and 508.

At 1206, process 1200 includes generating a media file including first signaling information and second signaling information of a viewport region corresponding to the ROI, the first signaling information including a center position and a dimension of the viewport region measured in a spherical space associated with the spherical representation, and the second signaling information indicating a region of a picture comprising the viewport region. The picture can be formed by projecting the spherical representation including the ROI using rectilinear projection onto a plane and can be a video frame. The viewport is to be rendered in display. In some examples, the first signaling information and the second signaling information may also define multiple viewport regions corresponding to multiple ROIs, and one of the multiple viewport regions can be selected for rendering in the display.

In some examples, the media file is based on an International Standards Organization (ISO) base media file format (ISOBMFF). In some examples, the media file may identify a sample group including a video sample corresponding to the spherical video scene; and wherein the first signaling information and the second signaling information are included in one or more syntax elements of the sample group.

In some examples, the media file is based on a media presentation description (MPD) format and includes a list of one or more adaptation sets. Each of the one or more adaptation sets may include one or more representations. The first signaling information, the second signaling information, and a link to the picture are included in one or more elements associated with the ROI included in the one or more representations. In some examples, the one or more representations are tile-based representations, and wherein the second signaling information includes identifiers associated with tiles including the ROI included in the one or more tile-based representations.

In some examples, the first signaling information can include a first angle and a second angle of a center of the viewport region with respect to a spherical center of the spherical representation of the scene, the first angle being formed on a first plane and the second angle being formed on a second plane, the first plane being perpendicular to the second plane. The first signaling information may further include a third angle associated with a width of the viewport region and a fourth angle associated with a height of the viewport region. The third angle may be formed between a first edge and a second edge of the viewport region; and wherein the fourth angle is formed between a third edge and a fourth edge of the viewport region. For example, the first angle can be a yaw angle, the second angle can be a pitch angle, whereas the third angle and the fourth angle can be, respectively, a yaw delta angle and a pitch delta angle as described in FIG. 4C, FIG. 4D, and FIG. 4E.

In some examples, the second signaling information may define one or more tiles of the picture including the viewport region. The one or more tiles may be part of a plurality of tiles included in the picture. In some examples, the second signaling information may further include one or more coordinates associated with the one or more tiles in the picture. In some examples, the one or more tiles form a tile group, and the second signaling information may include a group identifier associated with the tile group. Those tiles may be, for example, motion-constrained tiles.

In some examples, the second signaling information may include pixel coordinates associated with a pre-determined location within a viewport region formed by projecting the ROI on a plane, a width of the viewport region, and a height of the viewport region.

At 1208, process 1200 further includes providing the media file for rendering the 360-degree video data or for transmission of a portion of the 360-degree video data including at least the ROI. The rendering may include, for example, obtaining a set of tiles from the picture based on the second signaling information, and determining the location and the boundary of the viewport within the set of tiles based on the first signaling information, and extracting pixels corresponding to the viewport based on the determined location and boundary to render the viewport. The boundary can also be determined based on a pre-determined shape of the viewport. The shape of the viewport can be pre-determined based on, for example, a determination that the ROI is defined by at least four planes that intersect with the spherical representation, wherein each of the four planes also intersects with the spherical center of the spherical representation and each form a great circle. For example, as discussed above, the ROI can be defined by four great circles 502, 504, 506, and 508, and the viewport may be of the same shape as viewport 520 of FIG. 5C. Moreover, the transmission of the portion of the 360-degree video data may include, for example, determining the set of tiles in the picture that includes the ROI, and transmitting video data corresponding to the set of tiles to a renderer for rendering of the ROI.

FIG. 13 is a flowchart illustrating an example of a process 1300 for processing a media file. The process can be performed by, for example, an intermediate network device between a hosting server and a receiver device, a receiver device, etc.

At 1302, process 1300 includes obtaining a media file associated with 360-degree video data. The 360-degree video data may be generated by a camera set (e.g., omnidirectional cameras). The spherical representation can be formed by, for example, stitching a set of images captured by the camera set at a particular time point. The media file may include first signaling information and second signaling information of a viewport region corresponding to a region of interest (ROI) in the spherical representation.

In some examples, the ROI can be defined by at least four planes that intersect with the spherical representation; and wherein each of the four planes also intersects with the spherical center to form a great circle. For example, referring back to FIG. 5A, the ROI can be defined by four great circles 502, 504, 506, and 508.

At 1304, process 1300 includes extracting pixels corresponding to the viewport from the data of the picture based on the first signaling information and second signaling information.

In some examples, the media file is based on an International Standards Organization (ISO) base media file format (ISOBMFF). In some examples, the media file may identify a sample group including a video sample corresponding to the spherical video scene; and wherein the first signaling information and the second signaling information are included in one or more syntax elements of the sample group.

In some examples, the media file is based on a media presentation description (MPD) format and includes a list of one or more adaptation sets. Each of the one or more adaptation sets may include one or more representations. The first signaling information, the second signaling information, and a link to the picture are included in one or more elements associated with the ROI included in the one or more representations. In some examples, the one or more representations are tile-based representations, and wherein the second signaling information includes identifiers associated with tiles including the ROI included in the one or more tile-based representations.

In some examples, the first signaling information can include a first angle and a second angle of a center of the viewport region with respect to a spherical center of the spherical representation of the scene, the first angle being formed on a first plane and the second angle being formed on a second plane, the first plane being perpendicular to the second plane. The first signaling information may further include a third angle associated with a width of the viewport region and a fourth angle associated with a height of the viewport region. The third angle may be formed between a first edge and a second edge of the viewport region; and wherein the fourth angle is formed between a third edge and a fourth edge of the viewport region. For example, the first angle can be a yaw angle, the second angle can be a pitch angle, whereas the third angle and the fourth angle can be, respectively, a yaw delta angle and a pitch delta angle as described in FIG. 4C, FIG. 4D, and FIG. 4E.

In some examples, the second signaling information may define one or more tiles of the picture including the viewport region. The one or more tiles may be part of a plurality of tiles included in the picture. In some examples, the second signaling information may further include one or more coordinates associated with the one or more tiles in the picture. In some examples, the one or more tiles form a tile group, and the second signaling information may include a group identifier associated with the tile group. Those tiles may be, for example, motion-constrained tiles.

In some examples, the second signaling information may include pixel coordinates associated with a pre-determined location within a viewport region formed by projecting the ROI on a plane, a width of the viewport region, and a height of the viewport region.

In some examples, the extraction of the pixels may include identifying a set of tiles in the picture that contain the viewport region, and extracting the pixels from the set of tiles. The extraction of the pixels may further include determining a location and a boundary of the viewport in the set of tiles. The location can be determined based on the yaw angle and the pitch angle indicating the center position of the viewport region, whereas the boundary can be determined based on width and height indicated by respectively the yaw delta angle and the pitch delta angle. The boundary can also be determined based on a pre-determined shape of the viewport region. The shape can be determined based on the ROI being defined by at least four planes that intersect with the spherical representation, wherein each of the four planes also intersects with the spherical center of the spherical representation and form a great circle. For example, the shape of the viewport may be the same as viewport 520 of FIG. 5C. The extraction of the pixels can be based on the location and the boundary of the viewport region.

At 1306, process 1300 further includes providing the extracted pixels to render the viewport region in a display.

In some examples, the processes 1200 and 1300 may be performed by a computing device or an apparatus, such as the system 100 shown in FIG. 1. In some examples, the processes 1200 and 1300 can be performed by a file generation device, a file parsing or processing device, the encoding device 104 shown in FIG. 1 and FIG. 14, by another video transmission-side device or video transmission device, by the decoding device 112 shown in FIG. 1 and FIG. 15, and/or by another client-side device, such as a player device, a display, or any other client-side device. In one example, the process 1200 can be performed by a file generation device, the encoding device 104 shown in FIG. 1 and FIG. 14, and/or by another transmission-side device or video transmission device. In another example, the process 1300 can be performed by a file parsing or processing device, the decoding device 112 shown in FIG. 1 and FIG. 15, and/or by another client-side device, such as a player device, a display, or any other client-side device. In some cases, the computing device or apparatus may include a processor, microprocessor, microcomputer, or other component of a device that is configured to carry out the steps of processes 1200 and 1300. In some examples, the computing device or apparatus may include a camera configured to capture video data (e.g., a video sequence) including video frames. In some examples, a camera or other capture device that captures the video data is separate from the computing device, in which case the computing device receives or obtains the captured video data. The computing device may further include a network interface configured to communicate the video data. The network interface may be configured to communicate Internet Protocol (IP) based data or other type of data. In some examples, the computing device or apparatus may include a display for displaying output video content, such as samples of pictures of a video bitstream.

Processes 1200 and 1300 are illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 1200 and 1300 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., system 100). In some examples, a system includes a source device that provides encoded video data to be decoded at a later time by a destination device. In particular, the source device provides the video data to the destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from the source device to the destination device. In one example, computer-readable medium may comprise a communication medium to enable the source device to transmit encoded video data directly to the destination device in real-time. The encoded video data may be modulated according to a communication standard, such as a wireless communication protocol, and transmitted to the destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the destination device.

In some examples, encoded data may be output from the output interface to a storage device. Similarly, encoded data may be accessed from the storage device by the input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by the source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, systems may be configured to support one-way or two-way video transmission to support applications such as video streaming, video playback, video broadcasting, and/or video telephony.

In one example the source device includes a video source, a video encoder, and an output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by the output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the invention have been described.

Figure 14:
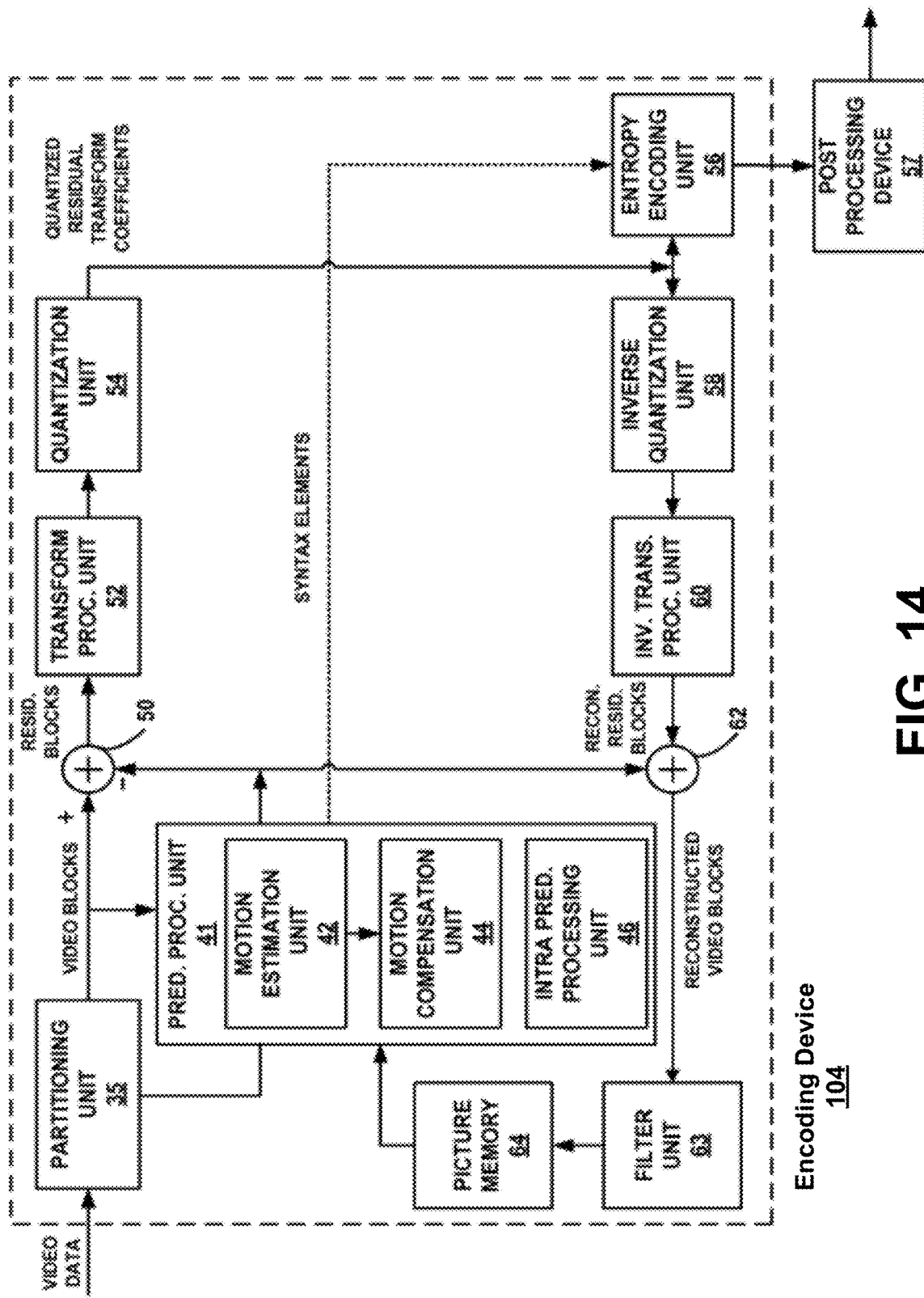
FIG. 14 is a block diagram illustrating an example video encoding device, in accordance with some examples.
Figure 15:
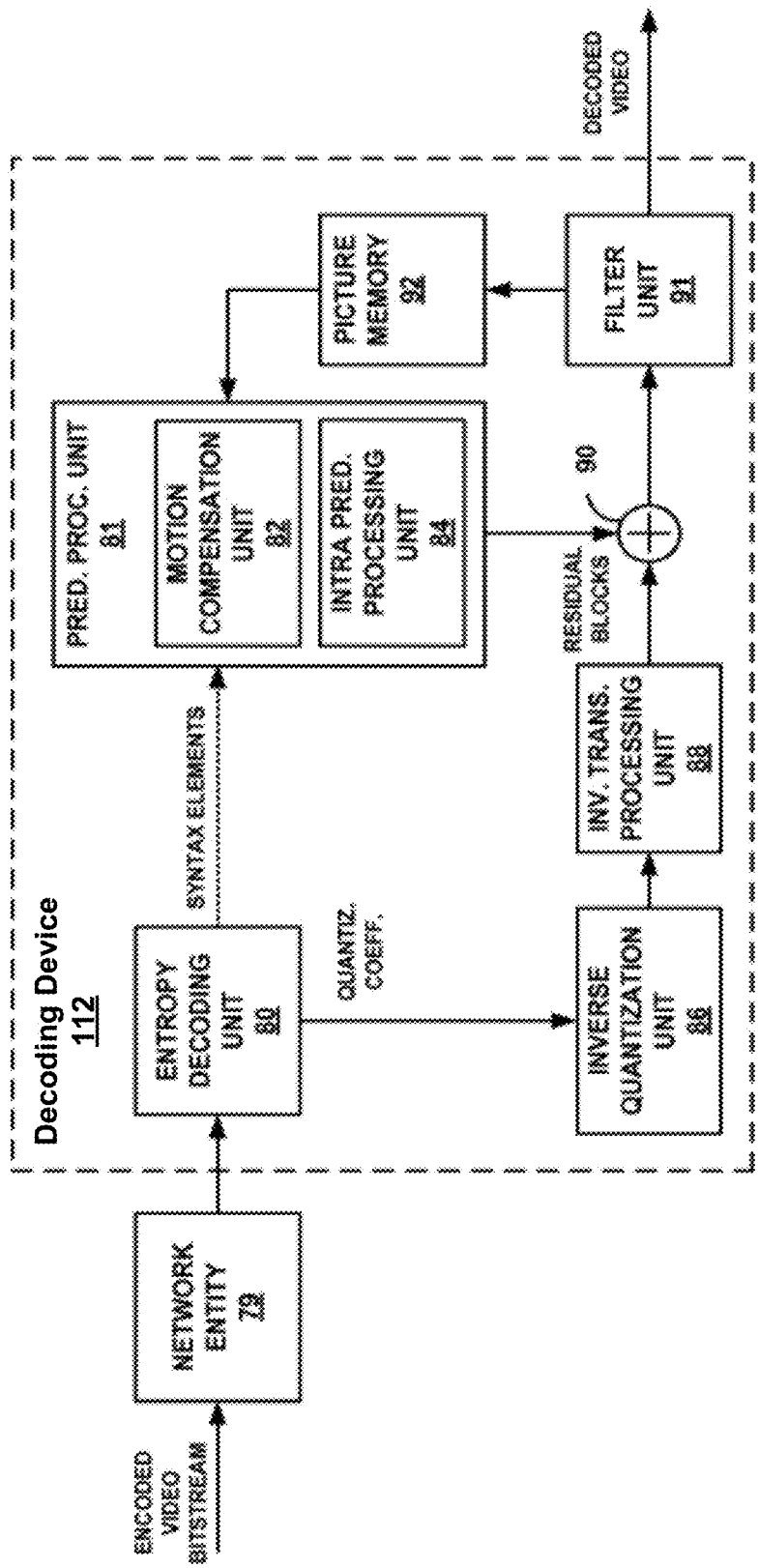
FIG. 15 is a block diagram illustrating an example video decoding device, in accordance with some examples.

Specific details of the encoding device 104 and the decoding device 112 are shown in FIG. 14 and FIG. 15, respectively. FIG. 14 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 14 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 14, the encoding device 104 receives video data, and partitioning unit 35 partitions the data into video blocks. The partitioning may also include partitioning into slices, slice segments, tiles, or other larger units, as wells as video block partitioning, e.g., according to a quad tree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bitrate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 14 represents an example of a video encoder configured to derive LIC parameters, adaptively determine sizes of templates, and/or adaptively select weights. The encoding device 104 may, for example, derive LIC parameters, adaptively determine sizes of templates, and/or adaptively select weights sets as described above. For instance, the encoding device 104 may perform any of the techniques described herein, including the processes described above with respect to FIG. 12 and FIG. 13. In some cases, some of the techniques of this disclosure may also be implemented by post processing device 57.

FIG. 15 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 14.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 15 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In this manner, the decoding device 112 of FIG. 15 represents an example of a video decoder configured to derive LIC parameters, adaptively determine sizes of templates, and/or adaptively select weights. The decoding device 112 may, for example, derive LIC parameters, adaptively determine sizes of templates, and/or adaptively select weights sets as described above. For instance, the decoding device 112 may perform any of the techniques described herein, including the processes described above with respect to FIG. 12 and FIG. 13.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of processing video data, the method comprising:
   obtaining a media file associated with 360-degree video data, the 360-degree video data including a spherical representation of a scene, the media file including first signaling information and second signaling information of a viewport region corresponding to a region of interest (ROI) in the spherical representation,
   the first signaling information including a center position and a dimension of the viewport region measured in a spherical space associated with the spherical representation, and
   the second signaling information indicating a region, which includes the viewport region, of a picture formed by projecting the spherical representation including the ROI onto a plane, the picture comprising a plurality of tiles;
   extracting pixels corresponding to the viewport region from data of the picture based on the first signaling information and second signaling information; and
   providing the pixels to render the viewport region for display,
   wherein the second signaling information identifies a minimum set, of the tiles of the plurality of tiles, that includes the viewport region, and
   wherein the minimum set is the least set, of the tiles of the plurality of tiles, that includes all of the pixels corresponding to the viewport region.

2. The method of claim 1, wherein the first signaling information includes a first angle and a second angle of a center of the viewport region with respect to a spherical center of the spherical representation of the scene, the first angle being formed on a first plane and the second angle being formed on a second plane, the first plane being perpendicular to the second plane.

3. The method of claim 1, wherein the first signaling information further includes a third angle associated with a width of the viewport region and a fourth angle associated with a height of the viewport region.

4. The method of claim 3, wherein the third angle is formed between a first edge and a second edge of the viewport region; and wherein the fourth angle is formed between a third edge and a fourth edge of the viewport region.

5. The method of claim 2, wherein the ROI is defined by at least four planes that intersect with the spherical representation; and wherein each of the four planes also intersects with the spherical center.

6. The method of claim 5, further determining a shape of the viewport region based on the intersecting of the at least four planes with the spherical representation.

7. The method of claim 6, wherein the pixels corresponding to the viewport region are extracted based on the shape.

8. The method of claim 1, wherein the extracting comprises using the first signaling information to determine a boundary of the viewport within the identified minimum set.

9. The method of claim 1, wherein the second signaling information includes one or more coordinates associated with the one or more tiles in the picture.

10. The method of claim 1, wherein the one or more tiles form a tile group, and wherein the second signaling information includes a group identifier associated with the tile group.

11. The method of claim 1, wherein the plurality of tiles are motion-constrained tiles.

12. The method of claim 1, wherein the second signaling information includes pixel coordinates associated with a pre-determined location within a viewport region formed by projecting the ROI on a plane, a width of the viewport region, and a height of the viewport region.

13. The method of claim 1, wherein the media file is based on an International Standards Organization (ISO) base media file format (ISOBMFF).

14. The method of claim 13, wherein the media file identifies a sample group including a video sample corresponding to the spherical representation of the scene; and wherein the first signaling information and the second signaling information are included in one or more syntax elements of the sample group.

15. The method of claim 1, wherein:
the media file is based on a media presentation description (MPD) format and includes one or more adaptation sets;
each of the one or more adaptation sets includes one or more representations; and
the first signaling information, the second signaling information, and a link to the picture are included in one or more elements associated with the ROI included in the one or more representations;
and wherein the method comprises: obtaining the picture based on the link included in the media file.

16. The method of claim 15, wherein the one or more representations are tile-based representations, and wherein the second signaling information includes identifiers associated with tiles including the ROI included in the tile-based representations.

17. The method of claim 1, wherein the spherical representation of the scene is projected onto the plane using a rectilinear projection.

18. The method of claim 1, further comprising: extracting pixels of multiple ROIs from the picture based on the first signaling information and the second signaling information.

19. An apparatus for processing video data, comprising:
a memory configured to store 360-degree video data; and
a processor configured to:
obtain a media file associated with the 360-degree video data, the 360-degree video data including a spherical representation of a scene, the media file including first signaling information and second signaling information of a viewport region corresponding to a region of interest (ROI) in the spherical representation,
the first signaling information including a center position and a dimension of the viewport region measured in a spherical space associated with the spherical representation, and
the second signaling information indicating a region, which includes the viewport region, of a picture formed by projecting the spherical representation including the ROI onto a plane, the picture comprising a plurality of tiles;
extract pixels corresponding to the viewport region from data of the picture based on the first signaling information and second signaling information; and
provide the pixels to render the viewport region for display,
wherein the second signaling information identifies a minimum set, of the tiles of the plurality of tiles, that includes the viewport region, and
wherein the minimum set is the least set, of the tiles of the plurality of tiles, that includes all of the pixels corresponding to the viewport region.

20. The apparatus of claim 19, wherein the processor is further configured to:
determine, from the first signaling information, a first angle and a second angle of a center of the viewport region with respect to a spherical center of the spherical representation of the scene, the first angle being formed on a first plane and the second angle being formed on a second plane, the first plane being perpendicular to the second plane.

21. The apparatus of claim 19, wherein the processor is further configured to:
determine, from the first signaling information, a third angle associated with a width of the viewport region and a fourth angle associated with a height of the viewport region.

22. The apparatus of claim 20, wherein the third angle is formed between a first edge and a second edge of the viewport region; and wherein the fourth angle is formed between a third edge and a fourth edge of the viewport region.

23. The apparatus of claim 19, wherein the ROI is defined by at least four planes that intersect with the spherical representation; and wherein each of the four planes also intersects with the spherical center.

24. The apparatus of claim 23, wherein the processor is further configured to determine a shape of the viewport region based on the intersecting of the at least four planes with the spherical representation.

25. The apparatus of claim 24, wherein the processor is configured to extract the pixels corresponding to the viewport region based on the shape.

26. The apparatus of claim 19, wherein the processor configured to extract the pixels is configured to use the first signaling information to determine a boundary of the viewport within the identified minimum set.

27. The apparatus of claim 19, wherein the processor is further configured to determine, from the second signaling information, one or more coordinates associated with the one or more tiles in the picture.

28. The apparatus of claim 19, wherein the one or more tiles form a tile group, and wherein the processor is further configured to determine, from the second signaling information, a group identifier associated with the tile group.

29. The apparatus of claim 19, wherein the plurality of tiles are motion-constrained tiles.

30. The apparatus of claim 19, wherein the processor is further configured to determine, from the second signaling information, pixel coordinates associated with a pre-determined location within a viewport region formed by projecting the ROI on a plane, a width of the viewport region, and a height of the viewport region.

31. The apparatus of claim 19, wherein the media file is based on an International Standards Organization (ISO) base media file format (ISOBMFF).

32. The apparatus of claim 31, wherein the media file identifies a sample group including a video sample corresponding to the spherical representation of the scene; and wherein the processor is further configured to extract the first signaling information and the second signaling information from one or more syntax elements of the sample group.

33. The apparatus of claim 19, wherein:
the media file is based on a media presentation description (MPD) format and includes one or more adaptation sets;
each of the one or more adaptation sets includes one or more representations; and
wherein the processor is further configured to:
determine, based on one or more elements associated with the ROI included in the one or more representations, the first signaling information, the second signaling information and a link to the picture; and
obtain the picture based on the link included in the media file.

34. The apparatus of claim 33, wherein the one or more representations are tile-based representations, and wherein the processor is configured to determine, based on the second signaling information, identifiers associated with tiles including the ROI included in the tile-based representations.

35. The apparatus of claim 19, wherein the spherical representation of the scene is projected onto the plane using a rectilinear projection.

36. The apparatus of claim 19, wherein the processor is further configured to extract pixels of multiple ROIs from the picture based on the first signaling information and the second signaling information.

37. The apparatus of claim 19, wherein the apparatus comprises a mobile device with one or more cameras to capture the 360-degree video data.

38. The apparatus of claim 19, wherein the apparatus comprises a display to render the viewport region.

39. A non-transitory computer-readable medium having stored thereon instructions that, when executed by one or more processors, cause the one or more processors to:
obtain a media file associated with 360-degree video data, the 360-degree video data including a spherical representation of a scene, the media file including first signaling information and second signaling information of a viewport region corresponding to a region of interest (ROI) in the spherical representation,
the first signaling information including a center position and a dimension of the viewport region measured in a spherical space associated with the spherical representation, and
the second signaling information indicating a region, which includes the viewport region, of a picture formed by projecting the spherical representation including the ROI onto a plane, the picture comprising a plurality of tiles;
extract pixels corresponding to the viewport region from data of the picture based on the first signaling information and second signaling information; and
provide the pixels to render the viewport region for display,
wherein the second signaling information identifies a minimum set, of the tiles of the plurality of tiles, that includes the viewport region, and
wherein the minimum set is the least set, of the tiles of the plurality of tiles, that includes all of the pixels corresponding to the viewport region.

40. A method of processing video data, the method comprising:
obtaining 360-degree video data, the 360-degree video data including a spherical representation of a scene;
determining a region of interest (ROI) in the spherical representation of the scene;
generating a media file including first signaling information and second signaling information of a viewport region corresponding to the ROI,
the first signaling information including a center position and a dimension of the viewport region measured in a spherical space associated with the spherical representation, and
the second signaling information indicating a region, which includes the viewport region, of a picture formed by projecting the spherical representation including the ROI onto a plane, the picture comprising a plurality of tiles; and
providing the media file for rendering the 360-degree video data or for transmission of a portion of the 360-degree video data including at least the ROI,
wherein the second signaling information identifies a minimum set, of the tiles of the plurality of tiles, that includes the viewport region, and
wherein the minimum set is the least set, of the tiles of the plurality of tiles, that includes all of the pixels corresponding to the viewport region.

41. An apparatus for processing video data, comprising:
a memory configured to store 360-degree video data; and
a processor configured to:
obtain 360-degree video data, the 360-degree video data including a spherical representation of a scene;
determine a region of interest (ROI) in the spherical representation of the scene;
generate a media file including first signaling information and second signaling information of a viewport region corresponding to the ROI,
the first signaling information including a center position and a dimension of the viewport region measured in a spherical space associated with the spherical representation, and
the second signaling information indicating a region, which includes the viewport region, of a picture formed by projecting the spherical representation including the ROI onto a plane, the picture comprising a plurality of tiles; and
provide the media file for rendering the 360-degree video data or for transmission of a portion of the 360-degree video data including at least the ROI,
wherein the second signaling information identifies a minimum set, of the tiles of the plurality of tiles, that includes the viewport region, and
wherein the minimum set is the least set, of the tiles of the plurality of tiles, that includes all of the pixels corresponding to the viewport region.

42. A non-transitory computer-readable medium having stored thereon instructions that, when executed by one or more processors, cause the one or more processor to:
obtain 360-degree video data, the 360-degree video data including a spherical representation of a scene;
determine a region of interest (ROI) in the spherical representation of the scene;
generate a media file including first signaling information and second signaling information of a viewport region corresponding to the ROI,
the first signaling information including a center position and a dimension of the viewport region measured in a spherical space associated with the spherical representation, and
the second signaling information indicating a region, which includes the viewport region, of a picture formed by projecting the spherical representation including the ROI onto a plane, the picture comprising a plurality of tiles; and provide the media file for rendering the 360-degree video data or for transmission of a portion of the 360-degree video data including at least the ROI, wherein the second signaling information identifies a minimum set, of the tiles of the plurality of tiles, that includes the viewport region, and wherein the minimum set is the least set, of the tiles of the plurality of tiles, that includes all of the pixels corresponding to the viewport region.

* * * * *